(12) United States Patent
Sano

(10) Patent No.: US 8,427,569 B2
(45) Date of Patent: Apr. 23, 2013

(54) IMAGE PICKUP LENS, IMAGE PICKUP APPARATUS, AND MOBILE TERMINAL

(75) Inventor: Eigo Sano, Hino (JP)

(73) Assignee: Konica Minolta Opto, Inc., Tokyo (JP)

( * ) Notice: Subject to any disclaimer, the term of this patent is extended or adjusted under 35 U.S.C. 154(b) by 122 days.

(21) Appl. No.: 12/638,837

(22) Filed: Dec. 15, 2009

(65) Prior Publication Data

US 2010/0220229 A1 Sep. 2, 2010

(30) Foreign Application Priority Data

Feb. 27, 2009 (JP) ................................. 2009-045802

(51) Int. Cl.
*G02B 13/16* (2006.01)

(52) U.S. Cl.
USPC .......................................... 348/335; 359/714

(58) Field of Classification Search .................. 348/335, 348/340, 342, 677; 359/677, 691, 714, 754, 359/763, 796, 797, 808
See application file for complete search history.

(56) References Cited

U.S. PATENT DOCUMENTS

| | | | | |
|---|---|---|---|---|
| 4,715,693 A | * | 12/1987 | Takase et al. | 359/675 |
| 4,983,026 A | * | 1/1991 | Kudo et al. | 359/675 |
| 5,825,556 A | | 10/1998 | Meyers | |
| 5,886,829 A | * | 3/1999 | Goosey, Jr. | 359/689 |
| 5,982,560 A | * | 11/1999 | Moon | 359/692 |
| 6,236,522 B1 | | 5/2001 | Shimizu | |
| 7,443,610 B1 | * | 10/2008 | Lin et al. | 359/714 |
| 7,466,497 B2 | | 12/2008 | Park et al. | |
| 7,826,151 B2 | * | 11/2010 | Tsai | 359/764 |
| 7,864,454 B1 | * | 1/2011 | Tang et al. | 359/764 |
| 7,965,454 B2 | * | 6/2011 | Tanaka et al. | 359/754 |
| 2009/0122423 A1 | * | 5/2009 | Park et al. | 359/764 |

FOREIGN PATENT DOCUMENTS

| | | |
|---|---|---|
| JP | 7-120670 | 5/1995 |
| JP | 11-133315 | 5/1999 |
| JP | 11-183796 | 7/1999 |
| JP | 2007-264180 | 10/2007 |
| JP | 2007-279282 | 10/2007 |
| JP | 2007-298572 | 11/2007 |
| TW | M313246 | 6/2007 |

* cited by examiner

*Primary Examiner* — Aung S Moe
*Assistant Examiner* — Chriss Yoder, III
(74) *Attorney, Agent, or Firm* — Cozen O'Connor

(57) ABSTRACT

An image pickup lens includes: a first lens with a positive power, including a convex surface facing the object side; an aperture stop; a second lens with a negative power, including a concave surface facing the image side; a third lens with a positive or negative power; a fourth lens with a positive power, including a convex surface facing the image side; and a fifth lens with a negative power, including a concave surface facing the image side. The surface of the fifth lens facing the image side is an aspheric surface and includes an inflection point. The image pickup lens satisfies the predetermined condition relating to a focal length of the first lens.

15 Claims, 26 Drawing Sheets

FIG. 3a
FIG. 3b
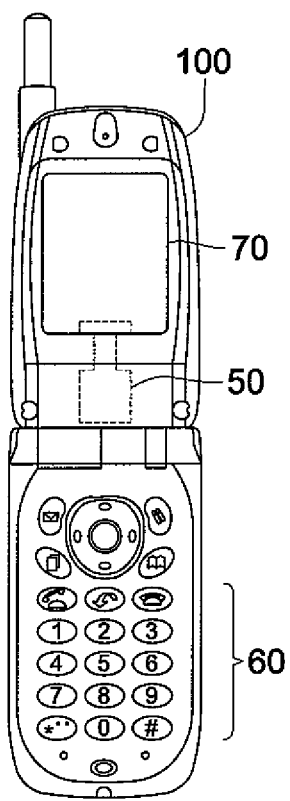
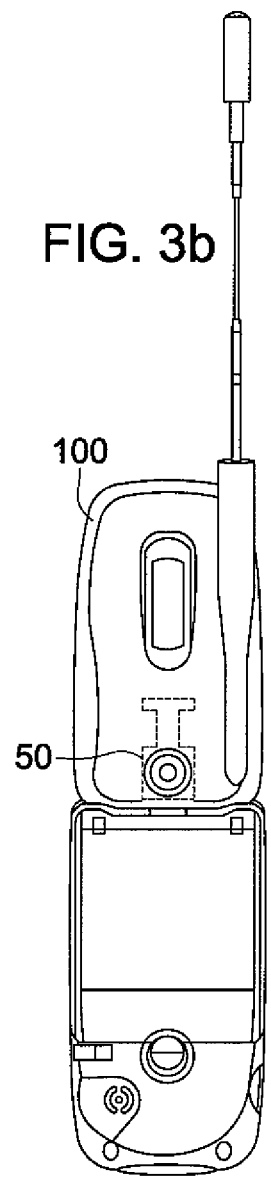

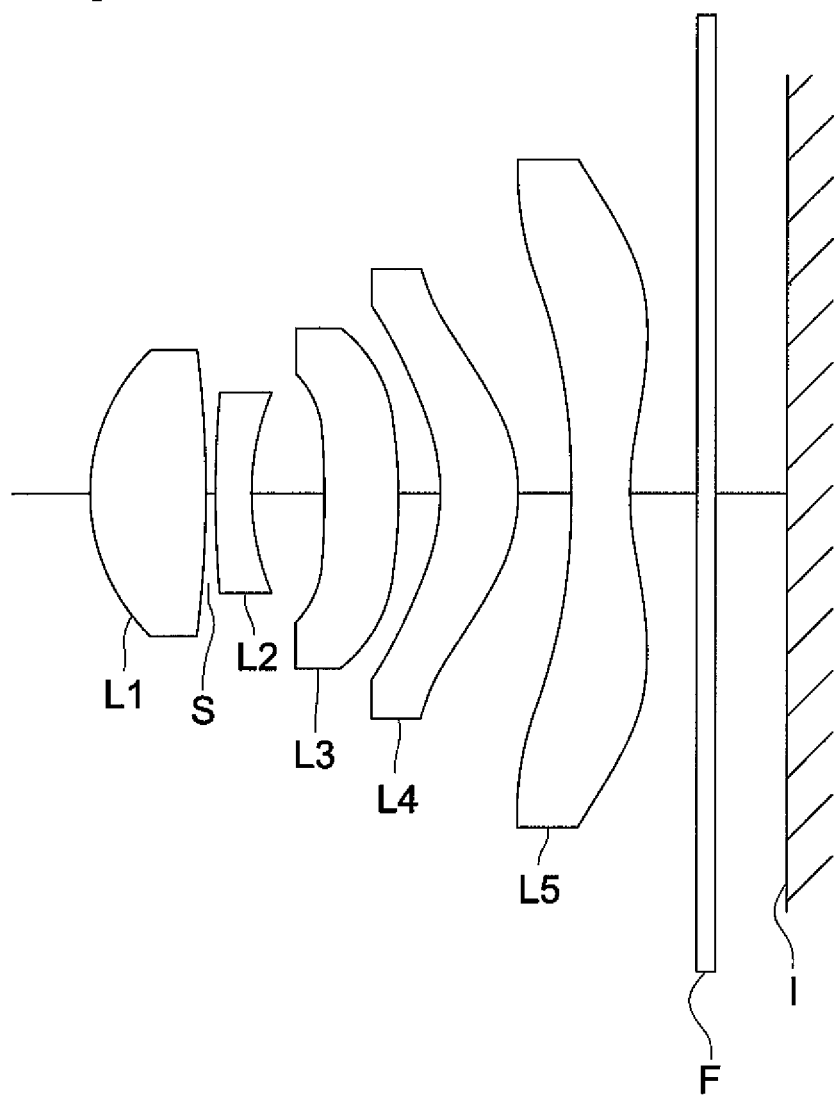

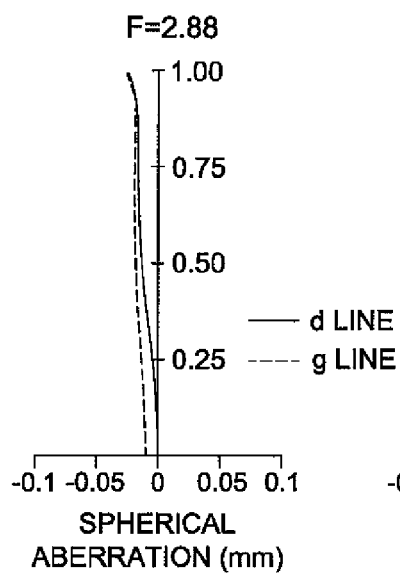
FIG. 8a
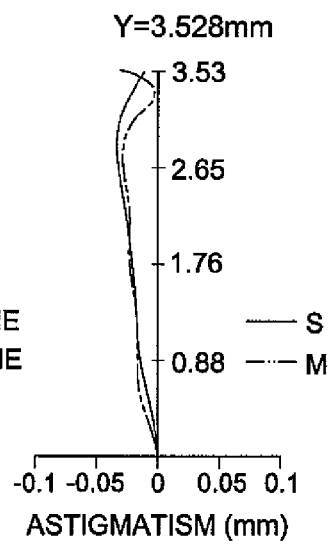
FIG. 8b
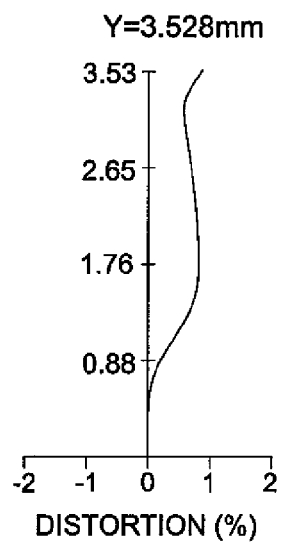
FIG. 8c
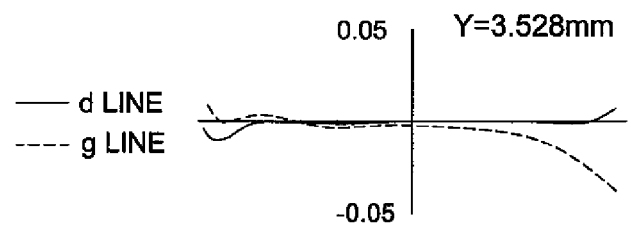
FIG. 8d
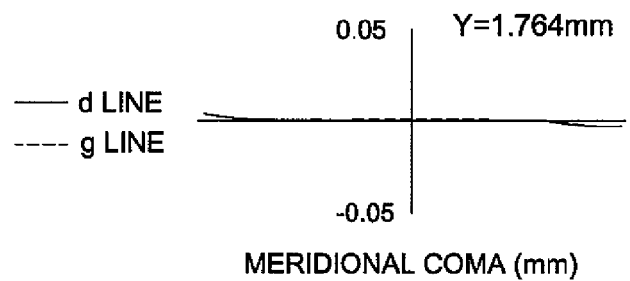

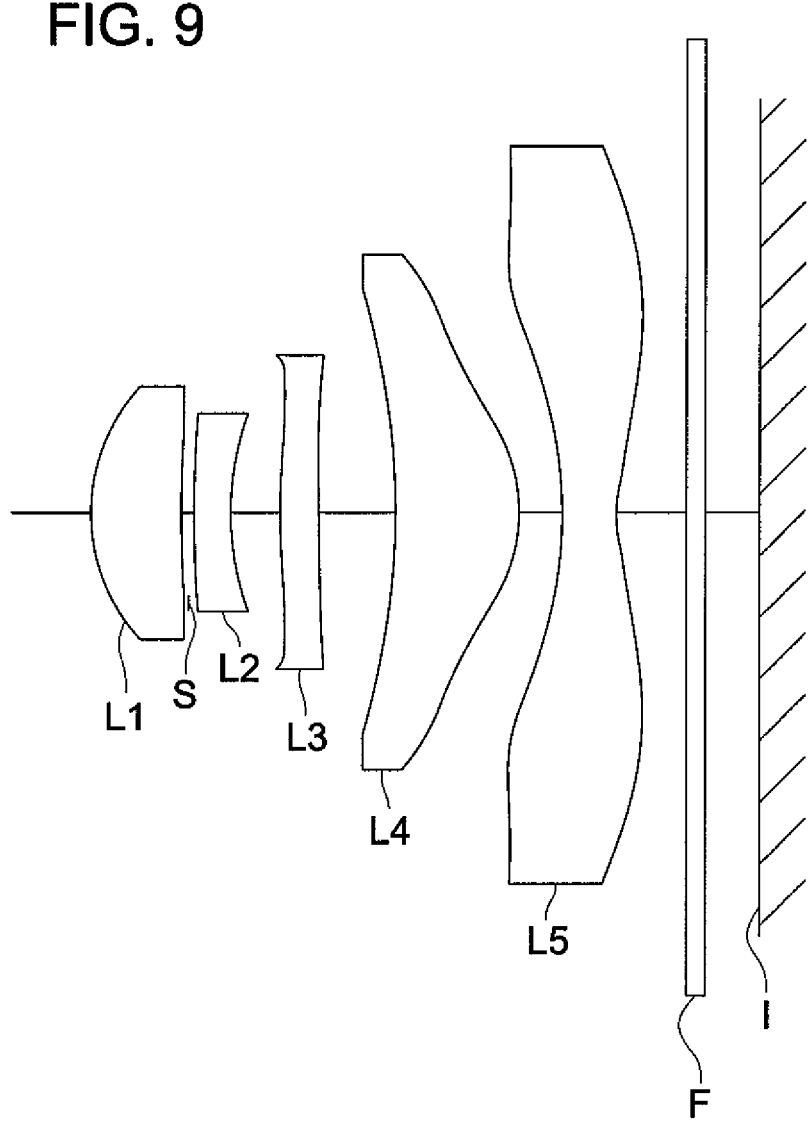

FIG. 10a
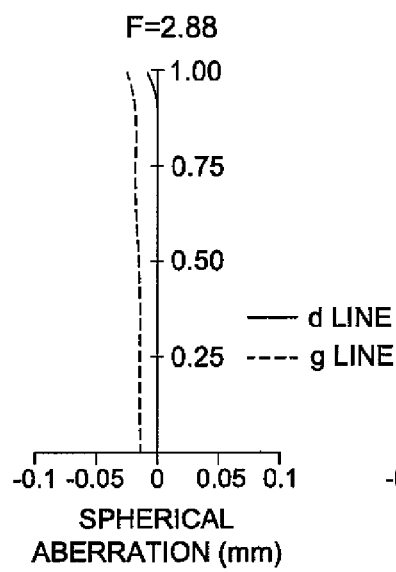
FIG. 10b
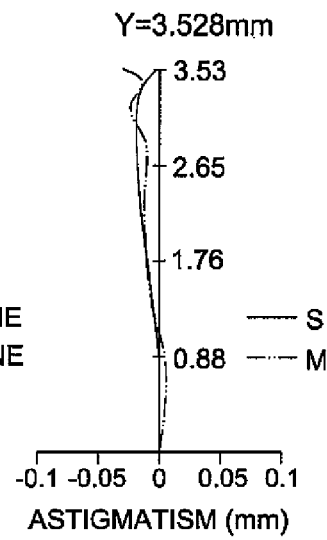
FIG. 10c
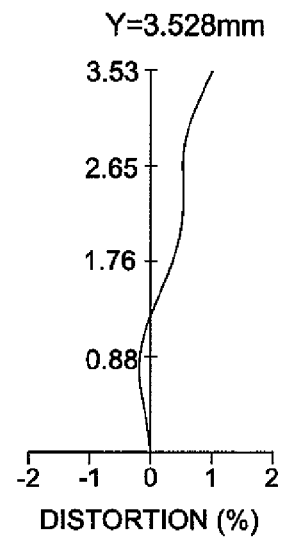
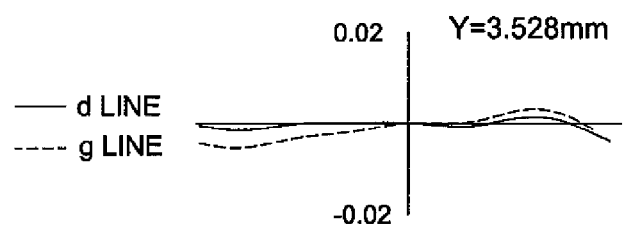
FIG. 10d
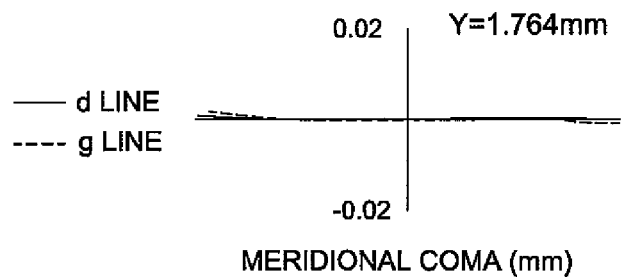

F=2.88

SPHERICAL ABERRATION (mm)

— d LINE
---- g LINE

Y=3.528mm

ASTIGMATISM (mm)

— S
--- M

Y=3.528mm

DISTORTION (%)

Y=3.528mm

— d LINE
---- g LINE

Y=1.764mm

— d LINE
---- g LINE

MERIDIONAL COMA (mm)

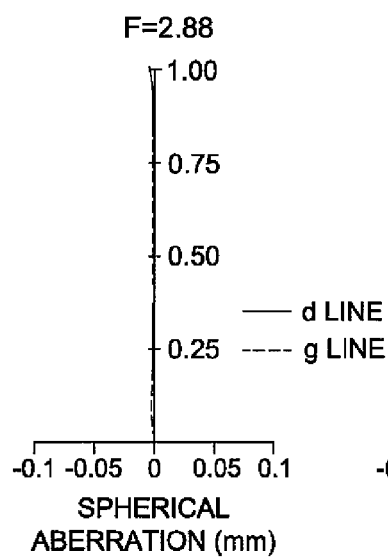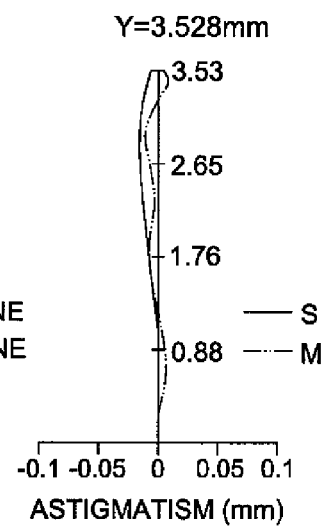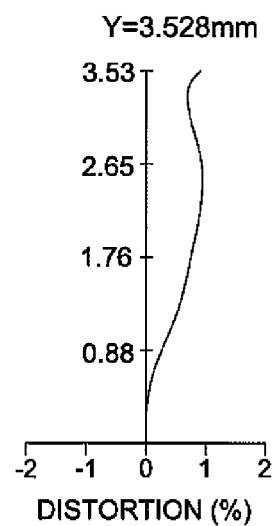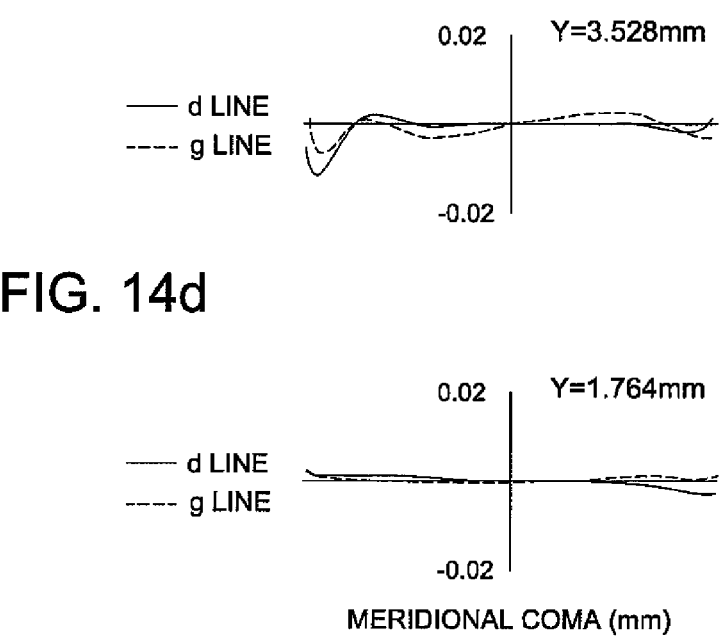

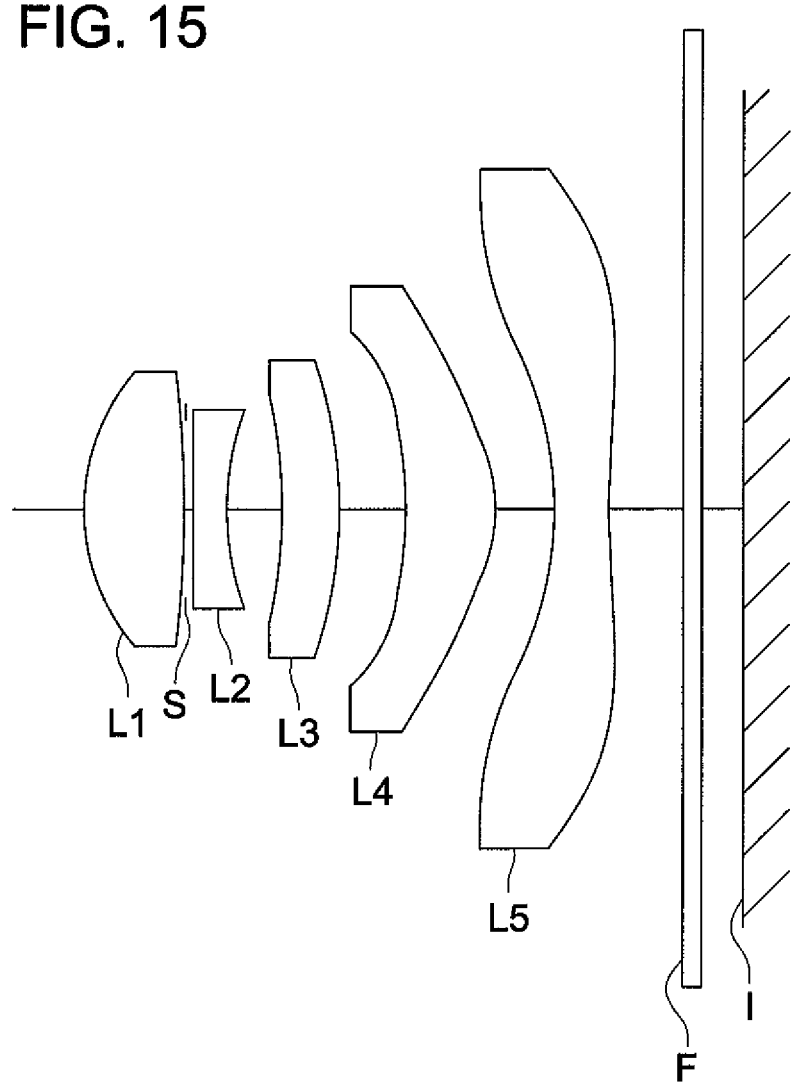

FIG. 16a
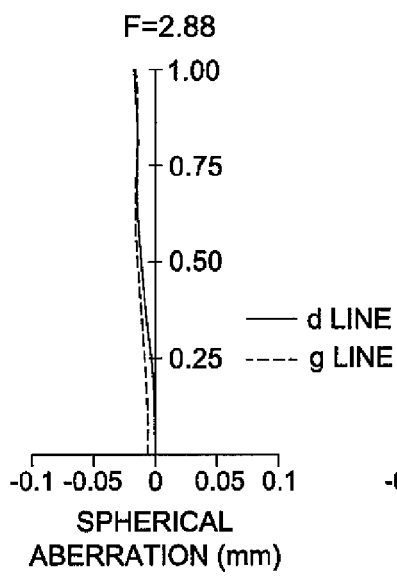
FIG. 16b
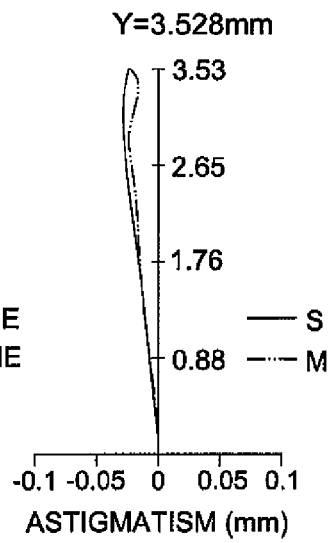
FIG. 16c
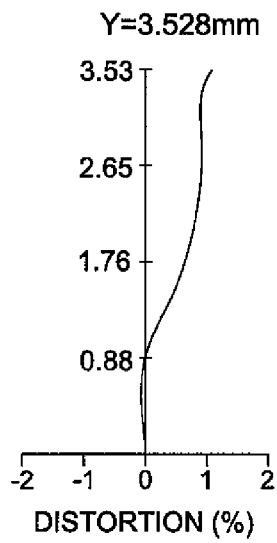
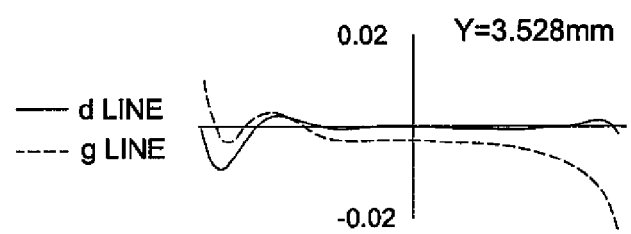
FIG. 16d
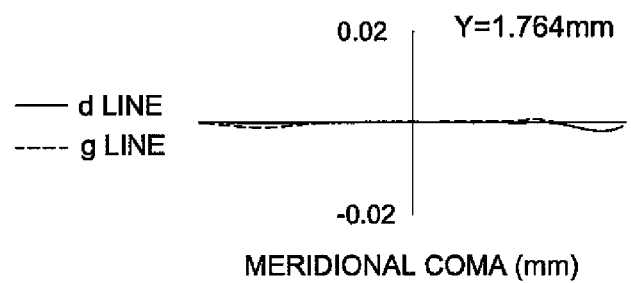
MERIDIONAL COMA (mm)

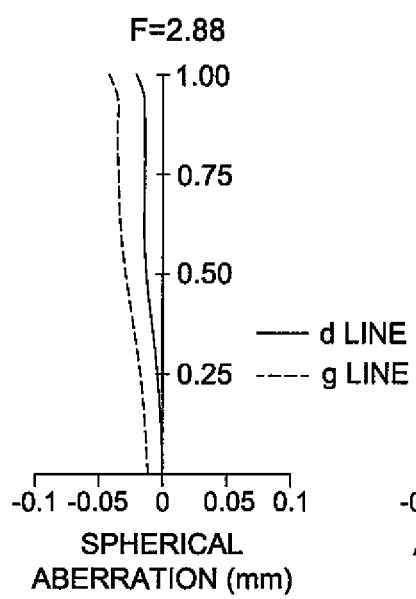
FIG. 18a
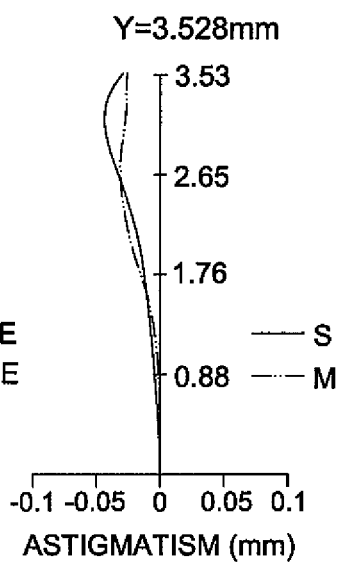
FIG. 18b
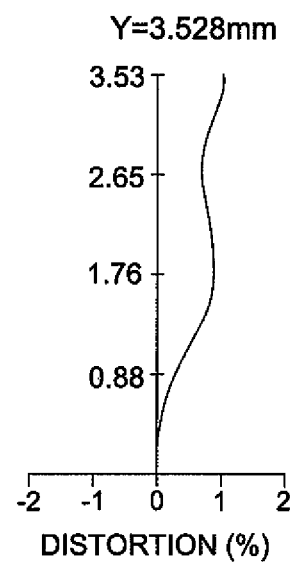
FIG. 18c
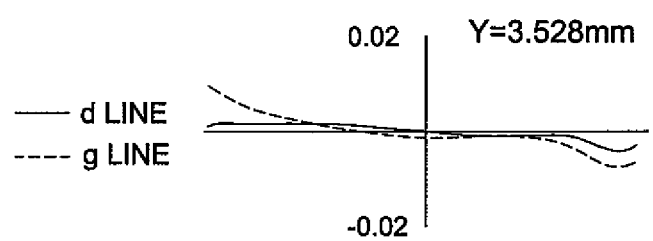
FIG. 18d
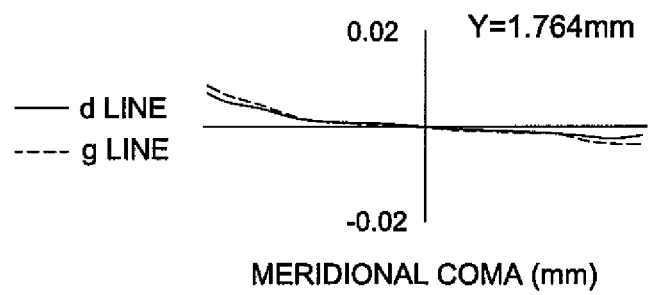
MERIDIONAL COMA (mm)

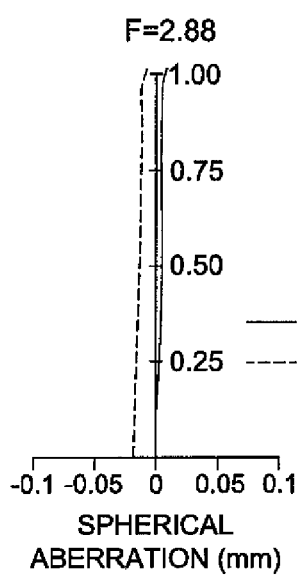
FIG. 20a
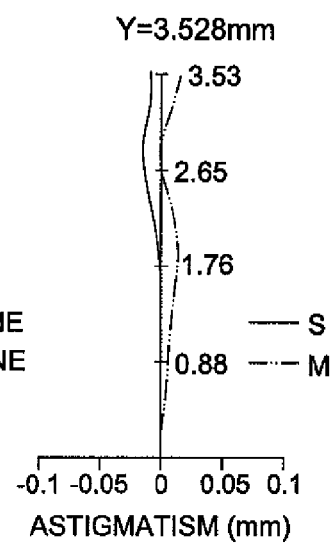
FIG. 20b
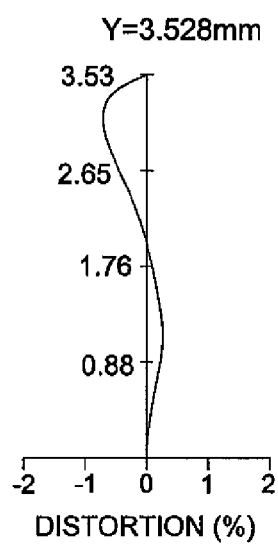
FIG. 20c
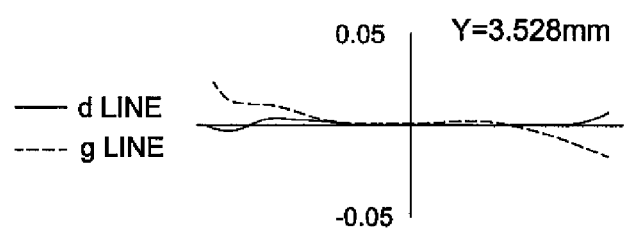
FIG. 20d
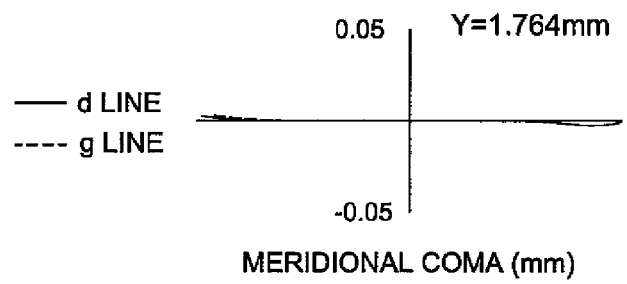

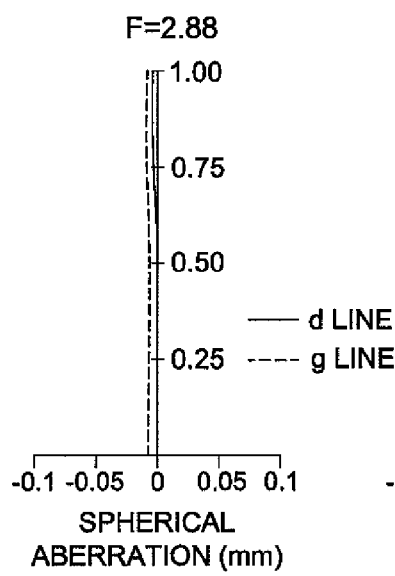
FIG. 24a
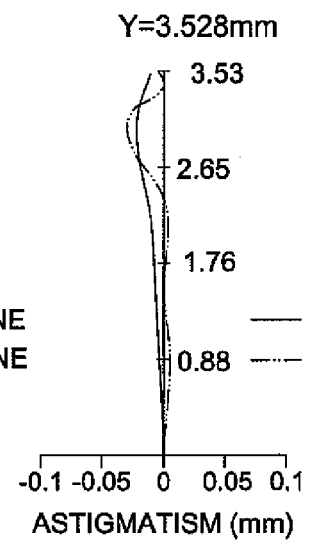
FIG. 24b
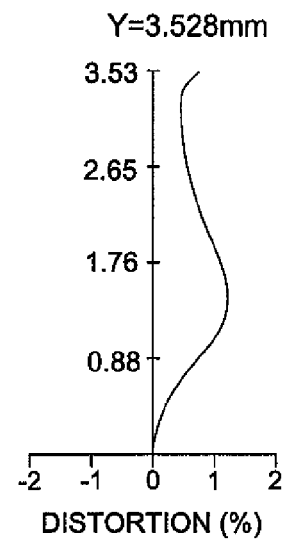
FIG. 24c
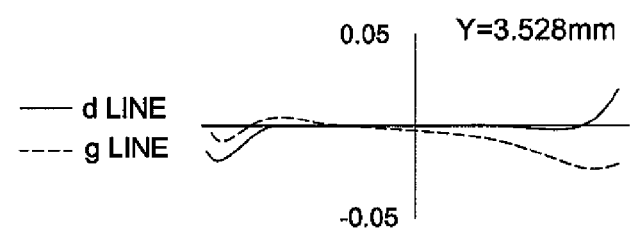
FIG. 24d
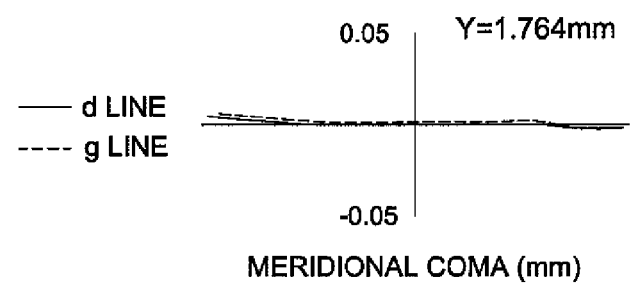

F=2.88
SPHERICAL ABERRATION (mm)

Y=3.508mm
ASTIGMATISM (mm)

Y=3.508mm
DISTORTION (%)

MERIDIONAL COMA (mm)

IMAGE PICKUP LENS, IMAGE PICKUP APPARATUS, AND MOBILE TERMINAL

This application is based on Japanese Patent Application No. 2009-045802 filed on Feb. 27, 2009, in Japanese Patent Office, the entire content of which is hereby incorporated by reference.

TECHNICAL FIELD

The present invention relates to an image pickup lens suitable for a small-sized image pickup apparatus employing a solid-state image pickup element such as a CCD type image sensor or a CMOS type image sensor, and to an image pickup apparatus and a mobile terminal.

BACKGROUND

In recent years, a mobile phone and a mobile information terminal each being equipped with an image pickup apparatus are coming into wide use, with a trend of enhancing performance and downsizing of an image pickup apparatus using a solid-state image pickup element such as a CCD (Charged Coupled Device) type image sensor or a CMOS (Complementary Metal Oxide Semiconductor) type image sensor. Furthermore, there are increasing demands for further downsizing for the image pickup lens that is mounted on such the image pickup apparatus.

As an image pickup lens to be used for this purpose, there has been proposed an image pickup lens composed of five elements, because it can provide higher property than a lens composed of three elements or four elements. As an example of the image pickup lens composed of five elements, unexamined Japanese Patent Application Publication (JP-A) No. 2007-264180 discloses an image pickup lens that is made up of the first lens having positive refractive power, the second lens having negative refractive power, the third lens having positive refractive power, the fourth lens having negative refractive power, and of the fifth lens having negative refractive power, in this order from the object side.

As another example, JP-A No. 2007-279282 discloses an image pickup lens that is made up of the first lens having negative refractive power, the second lens having positive refractive power, the third lens having negative refractive power, the fourth lens having positive refractive power, and of the fifth lens having negative refractive power in this order from the object side.

SUMMARY

In the image pickup lens in JP-A No. 2007-264180, the first lens, second lens, and third lens provide most of the refractive power of the total optical system, and each of the fourth lens and fifth lens exhibits only a function as a lens with a weak refractive power for correcting the image surface. Therefore, aberrations are insufficiently corrected, and downsizing of the total length of the optical system causes a deterioration of its optical property to hardly cope with an image pickup element with a larger number of pixels, which are problems.

Further, in the image pickup lens in JP-A No. 2007-279282, the fore lens group in the optical system is structured by the first lens and second lens and they are formed by sphere lenses. Therefore, the spherical aberration and coma is insufficiently corrected, and an excellent optical property is hardly secured in the image pickup lens. Further, the rear lens group is structured by the third lens, fourth lens, and fifth lens, and both of the fore lens group and the rear lens group have positive refractive power. Such the structure is disadvantageous to downsize the optical system, because the principal point of the optical system is located closer to the image to elongate a back focal length of the optical system, compared with an optical system of a telephoto type which has a rear lens group with a negative refractive power.

In view of the aforesaid problems, there is provided an image pickup lens with five elements wherein various aberrations are properly corrected in spite of its size that is smaller than that of a conventional lens, and further provided an image pickup apparatus equipped with the image pickup lens and a mobile terminal equipped with the image pickup apparatus.

An image pickup lens relating to the present invention is provided for forming an image of an object on a photoelectrical converter of a solid-state image pickup element. The image pickup lens comprises, in order from an object side thereof: a first lens having a positive power and comprising a convex surface facing the object side; an aperture stop; a second lens having a negative power and comprising a concave surface facing an image side of the image pickup lens; a third lens having a positive or negative power; a fourth lens having a positive power and comprising a convex surface facing the image side; and a fifth lens having a negative power and comprising a concave surface facing the image side. The surface of the fifth lens facing the image side is an aspheric surface and an inflection point is arranged on an area on the surface of the fifth lens, where the area excludes an intersection point of the surface of the fifth lens with an optical axis. The image pickup lens satisfies the predetermined conditional expression relating to a focal length of the first lens.

These and other objects, features and advantages according to the present invention will become more apparent upon reading of the following detailed description along with the accompanied drawings.

BRIEF DESCRIPTION OF DRAWINGS

Embodiments will now be described, by way of example only, with reference to the accompanying drawings which are meant to be exemplary, not limiting, and wherein like elements numbered alike in several Figures, in which:

FIG. 3a is a front view of a mobile phone to which an image pickup unit is applied, and FIG. 3b is a rear view of a mobile phone on which an image pickup unit is applied;

FIG. 7 is a sectional view in the direction of the optical axis of the image pickup lens in Example 2;

FIGS. 8a through FIG. 8d show aberration diagrams in Example 2 including spherical aberration, astigmatism, distortion, and meridional coma, respectively;

FIG. 9 is a sectional view in the direction of the optical axis of the image pickup lens in Example 3;

FIGS. 10a through FIG. 10d show aberration diagrams in Example 3 including spherical aberration, astigmatism, distortion, and meridional coma, respectively;

FIGS. 14a through 14d show aberration diagrams in Example 5 including spherical aberration, astigmatism, distortion, and meridional coma, respectively;

FIG. 15 is a sectional view in the direction of the optical axis of the image pickup lens in Example 6;

FIGS. 16a through 16d show aberration diagrams in Example 6 including spherical aberration, astigmatism, distortion, and meridional coma, respectively;

FIGS. 18a through 18d show aberration diagrams in Example 7 including spherical aberration, astigmatism, distortion, and meridional coma, respectively;

FIGS. 20a through 20d show aberration diagrams in Example 8 including spherical aberration, astigmatism, distortion, and meridional coma, respectively;

FIGS. 24a through 24d show aberration diagrams in Example 10 including spherical aberration, astigmatism, distortion, and meridional coma, respectively;

DESCRIPTION OF EMBODIMENTS

Figure 1:
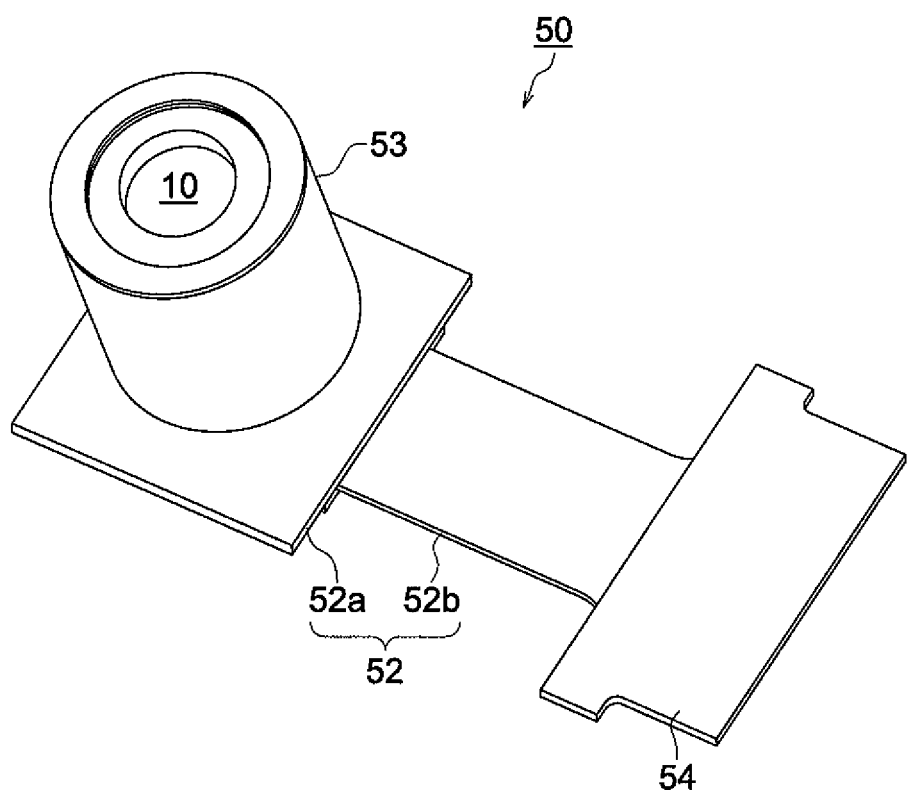
FIG. 1 is a perspective view of image pickup unit 50 relating to the embodiment of the invention.

Embodiments of the invention will be explained as follows.

One of the embodiments is an image pickup lens for forming an image of an object on a photoelectrical converter of a solid-state image pickup element. The image pickup lens comprises, in order from an object side thereof: a first lens having a positive power and comprising a convex surface facing the object side; an aperture stop; a second lens having a negative power and comprising a concave surface facing an image side of the image pickup lens; a third lens having a positive or negative power; a fourth lens having a positive power and comprising a convex surface facing the image side; and a fifth lens having a negative power and comprising a concave surface facing the image side. The surface of the fifth lens facing the image side is an aspheric surface and an inflection point is arranged on an area on the surface of the fifth lens, where the area excludes an intersection point of the surface of the fifth lens with an optical axis. The image pickup lens satisfies the following expression.

$$0.50 < f1/f < 0.85 \tag{1}$$

In the expression, f1 is a focal length of the first lens, and f is a focal length of a total system of the image pickup lens.

The present embodiment has a principal structure for obtaining a compact image pickup lens in which aberrations corrected in an excellent condition, and the principal structure includes a first lens with a positive refractive power in which a convex surface faces the object side, an aperture stop, a second lens with a negative refractive power in which a concave surface faces the image side, the third lens with a positive or negative power, and a fourth lens with a positive power in which a convex surface faces the image side, a fifth lens with a negative refractive power in which a concave surface faces the image side, in this order from the object side. This optical system shows a lens structure of so called the telephoto type in which a positive lens group made up of the first lens, the second lens, the third lens, and the fourth lens, and a negative lens group made up of the fifth lens are arranged in this order from the object side. Such the lens structure is advantageous to achieve a downsizing the total length of the image pickup lens.

In this specification, a refractive power of each of the first lens, the second lens, the third lens, the fourth lens, and the fifth lens, means a paraxial refractive power of the lens. For example, the first lens having a positive power means that the first lens group has a positive refractive power around the optical axis.

As for a dimension of a small-sized image pickup lens, downsizing at the level satisfying the following expression is targeted. By satisfying this range, a small size and a light weight of the overall image pickup apparatus can be realized.

$$L/2Y < 1.00 \tag{9}$$

In this expression, L represents a distance along the optical axis from the lens surface closest to the object side to the focal point on the image side in the total image pickup lens system, and 2Y represents a length of a diagonal line of an image pickup surface of a solid-state image pickup element (a length of a diagonal line of a rectangular effective image pixel area of the solid-state image pickup element).

In the expression, "the focal point on the image side" means an image point formed when a parallel light beam that is in parallel with the optical axis enters the image pickup lens.

Meanwhile, when a parallel flat plate such as an optical lowpass filter, an infrared blocking filter and a seal glass of a solid-state image sensor package is arranged between the lens surface closest to the image side and the position of the focal point on the image side, the value of L mentioned above is required to be calculated under the condition that the space of the parallel flat plate is converted into an air distance. A range of the following expression is more preferable.

$$L/2Y < 0.90 \tag{9'}$$

Furthermore, by forming two lenses in the five-element construction into negative lenses, it is possible to increase the number of surfaces with divergent action to correcting Petzval's sum easily, and is possible to obtain an image pickup lens wherein excellent image forming performance is secured up to the peripheral portion of the formed image.

Further, by forming the image side surface of the fifth lens which is arranged to be closest to the image side into an aspheric shape, various aberrations can properly be corrected on the peripheral portions of the image. By forming the surface of the fifth lens facing the image side into an aspheric surface including an inflection point on an area excluding the intersection point of the surface of the fifth lens and the optical axis, telecentricity of a light flux at the image side can be secured easily.

In this embodiment, "the inflection point" is a point on an aspheric surface such that a tangential plane on a peak of the aspheric surface becomes perpendicular to the optical axis, on a curved line of the cross-sectional shape of the lens within its effective radius.

The conditional expression (1) is intended for proper setting of the focal length of the first lens, appropriate reduction in the overall length of the image pickup lens and proper aberration correction. When the value of the conditional expression (1) is below the upper limit, the refractive power of the first lens can be maintained at an appropriate level, the composite principal point of the first through fourth lenses can be positioned closer to the object side, and the overall length of the image pickup lens can be reduced. In the meantime, when the value of the conditional expression (1) is above the lower limit of the conditional expression, the refractive power of the first lens is prevented from being excessively increased. It is also possible to reduce the high-order spherical aberration and coma occurred in the first lens.

More preferably, the following conditional expression (1') is met.

$$0.52 < f1/f < 0.80 \tag{1'}$$

When the curvature radius of the object side surface of the first lens is reduced to increase the refractive power based on the definition of the focal length of the first lens within the range of the conditional expression (1), the composite principal point of the entire optical system can be positioned still closer to the object side, hence, the overall length of the image pickup lens can be reduced. However, if the aperture stop is located closer to the object than the first lens, the marginal light passing through the object side surface of the first lens will be refracted excessively, with the result that the coma and lateral chromatic aberration on the periphery will be increased. To avoid this, an aperture stop is positioned between the first lens and second lens. This arrangement ensures that the angle of refraction of the marginal light passing through the object side surface of the first lens is not excessively increased, even if the curvature radius of the object side surface of the first lens is reduced. This ensures compatibility between downsizing of the image pickup lens and correction of the aberration in a satisfactory manner.

The above image pickup lens preferably satisfies the following expression.

$$0.25 < r1/f < 0.50 \tag{2}$$

In the expression, r1 is a curvature radius of the surface of the first lens facing the object side.

As described above, the curvature radius of the object side surface of the first lens plays a major role in ensuring compatibility between downsizing of the image pickup lens and correction of aberrations. To put it in more detail, it is preferred that the conditional expression (2) be satisfied.

The conditional expression (2) is intended for proper setting of the curvature radius of the object side surface of the first lens, appropriate reduction of the overall length of the image pickup lens and proper correction of aberrations in a satisfactory manner. When the value of the conditional expression (2) is below the upper limit, the refractive power of the object side surface of the first lens can be maintained at a proper level, and the composite principal point of the first and second lenses can be arranged closer to the object, with the result that the overall length of the image pickup lens can be reduced. In the meantime, when the value of the conditional expression (2) is above the lower limit, the refractive power of the object side surface of the first lens is not excessively increased, and the high-order spherical aberration and coma occurred in the first lens can be controlled to be small.

More preferably, the following conditional expression (2') is met.

$$0.28 < r1/f < 0.47 \tag{2'}$$

The above image pickup lens preferably satisfies the following expression.

$$0.70 < r4/r1 < 2.50 \tag{3}$$

In the expression, r1 is a curvature radius of the surface of the first lens facing the object side and r4 is a curvature radius of the surface of the second lens facing the image side.

The conditional expression (3) is intended for proper setting of the ratio between the curvature radius of the object side surface of the first lens and the curvature radius of the image side surface of the second lens, and correction of the off-axis aberrations to a satisfactory level. When the value of the conditional expression (3) is below the upper limit, the curvature radius of the image side surface of the second lens can be reduced to a satisfactory level with reference to the curvature radius of the object side surface of the first lens, and the coma, chromatic aberration and distortion of the off-axis light occurred in the object side surface of the first lens can be corrected to a satisfactory level by the diverging effect of the image side surface of the second lens. In the meantime, when the value of the conditional expression (3) is above the lower limit, the curvature radius of the image side surface of the second lens is not excessively reduced. It can prevent off-axis aberrations occurred in the object side surface of the first lens from being over-corrected and can maintain the telecentricity on the lens periphery to a satisfactory level.

More preferably, the following conditional expression (3') is met.

$$0.8 < r4/r1 < 2.3 \tag{3'}$$

In the above image pickup lens, it is preferable that the surface of the second lens facing the image side is an aspheric surface on which a center portion has a negative refractive power and the negative refractive power becomes smaller at a position being farther from the center portion to a periphery.

When the image side surface of the second lens is designed in such an aspherical shape on which the negative refractive power is reduced as one goes toward the periphery from the optical axis, light will not be excessively deflected on the periphery, and satisfactory telecentricity can be maintained on the lens periphery after off-axis aberrations have been corrected to a satisfactory level.

The above image pickup lens preferably satisfies the following expression.

$$15 < v2 < 31 \tag{4}$$

In the expression, v2 is an Abbe number of the second lens.

The conditional expression (4) is intended for proper setting of the Abbe number of the second lens. When the value of conditional expression (4) is below the upper limit, the dispersion of the second lens can be increased to a satisfactory level, and chromatic aberration such as a longitudinal chromatic aberration or lateral chromatic aberration can be corrected to a satisfactory level, while the refractive power of the second lens is kept at a small level. In the meantime, when the value of conditional expression (4) is above the lower limit, easily available materials can be used to design the structure.

More preferably, the following conditional expression (4') is met.

$$15 < v2 < 27 \tag{4'}$$

The above image pickup lens preferably satisfies the following expression.

$$1.6 < n2 < 2.10 \tag{5}$$

In the expression, n2 is a refractive index of the second lens.

The conditional expression (5) is intended for proper correction of the chromatic aberration and curvature of field of the whole system of the image pickup lens. When the value of conditional expression (5) is below the upper limit, the refractive power of the second lens with a relatively larger dispersion can be maintained at a satisfactory level, and the chromatic aberration and curvature of field can be corrected to a satisfactory level. In the meantime, when the value of conditional expression (5) is above the lower limit, easily available materials can be used to design the structure.

More preferably, the following conditional expression (5') is met.

$$1.6 < n2 < 2.00 \qquad (5')$$

In the above image pickup lens, the third lens preferably has a positive refractive power.

By forming the third lens to have a positive refractive power, the zoom lens includes the first lens with the positive refractive power, the second lens with the negative power and the third lens with the positive power which show a lens structure of so-called the triplet type. Therefore, aberrations can be satisfactorily corrected in the first through third lenses.

In the above image pickup lens, it is preferable that the third lens is in a meniscus shape whose convex surface faces the image side.

An off-axis light flux is strongly deflected by the second lens, but the surfaces of the third lens transmit the deflected off-axis light flux with a reduced refractive angle to guide it to the fourth lens, by forming the third lens into a meniscus shape whose convex surface faces the image side. It reduces the generation of off-axis aberrations in the third lens.

The image pickup lens preferably satisfies the following expression.

$$15 < v3 < 31 \qquad (6)$$

In the expression, v3 is an Abbe number of the third lens.

The conditional expression (6) is intended for proper setting of the Abbe number of the third lens and satisfactory correction of the on-axis and off-axis chromatic aberrations. When the negative second lens is made of a material with greater dispersion, the longitudinal chromatic aberration can be corrected to a satisfactory level. However, when the image side surface of the second lens is a strongly divergent surface, the peripheral light will be heavily deflected and the lateral chromatic aberration will be increased on the periphery. Thus, the third lens is made of a material with greater dispersion. This arrangement allows the third lens to correct the lateral chromatic aberration caused in the periphery of the second lens. When the third lens has a relatively reduced refractive power, the off-axis chromatic aberration can be corrected to a satisfactory level without the on-axis chromatic aberration being Over-corrected, even if a material with greater dispersion is used.

If the value of the conditional expression (6) is reduced below the lower limit, the lateral chromatic aberration caused in the second lens is not sufficiently corrected by the third lens, with the result that the lateral chromatic aberration is increased. In the meantime, when the value of the conditional expression (6) exceeds the upper limit, the lateral chromatic aberration can be reduced, but correction of the longitudinal chromatic aberration will be insufficient. These problems can be solved when the conditional expression (6) is met. More preferably, the following conditional expression (6') is met.

$$15 < v3 < 27 \qquad (6')$$

In the above image pickup lens, it is preferable that the fourth lens is in a meniscus shape whose convex surface faces the image side.

An off-axis light flux is strongly deflected by the second lens, but the surfaces of the fourth lens transmit the deflected off-axis light flux with a reduced refractive angle to guide it to the fifth lens, by forming the fourth lens into a meniscus shape whose convex surface faces the image side. It reduces the generation of off-axis aberrations.

In the above image pickup lens, it is preferable that the surface of the fourth lens facing the image side is an aspheric surface on which a center portion has a positive refractive power, and the positive refractive power becomes smaller at a position being farther from the center portion to a periphery.

By forming the object side surface of the fourth lens into an aspheric shape on which the negative refractive power becomes smaller at a position being farther from the optical axis to the periphery, telecentricity in the periphery can be secured in an excellent condition. Further, it does not require the image side surface of the second lens to have negative refractive power that is excessively weak on the lens periphery portion, which makes it possible to correct off-axis aberration properly.

In the above image pickup lens, it is preferable that the image pickup lens moves the first, second, and third lenses for adjusting a focal position of the image pickup lens, and satisfies the following expression.

$$0.05 < d6/f < 0.20 \qquad (7)$$

In the expression, d6 is an air distance along an optical axis between the third lens and the fourth lens.

In an image pickup apparatus, when an attempt is made to adjust the focal point position in the auto-focusing operation and the switching operation to/from the macro photograph mode, it is a common practice that the entire lens group is moved to be drawn out from the apparatus body in the optical axis direction. Alternatively, it is also possible that part of the lens group, e.g., the first through third lenses are moved to be drawn out in the optical axis direction to adjust the position of the focal point. If the partial lens group is moved, it is possible to minimize the deterioration in the performance of the image pickup lens at the time of adjusting the focal point position to a short distance, depending on the type of the optical system. Since only part of the lens group—not the entire lens group— is to be moved, the drive mechanism can be simplified, and the entire image pickup apparatus can be designed in a compact and lightweight structure.

When the partial lens group is moved, air distance along the optical axis between the third and fourth lenses is preferably set to meet the conditional expression (7). When the value of the conditional expression (7) is kept above the lower limit, the sufficient stroke for moving the first through third lenses can be ensured. Further, positive refractive power around the fourth lens can be maintained at an appropriate level, the lateral chromatic aberration can be properly corrected, and the satisfactory telecentricity on the periphery can be easily ensured. In the meantime, when the value of the conditional expression (7) is kept below the upper limit, the overall length of the image pickup lens can be decreased without the need of excessively increasing the air distance along the optical axis between third and fourth lenses. More preferably, the following conditional expression (7') is met.

$$0.05 < d6/f < 0.18 \qquad (7')$$

The above image pickup lens preferably satisfies the following expression.

$$0.7 < f123/f < 1.4 \qquad (8)$$

In the expression, f123 is a composite focal length of the first, second, and third lenses, and f is a focal length of the total system of the zoom lens.

The conditional expression (8) is intended for proper setting of the composite focal length of the first through third lenses when the first through third lenses are moved to be drawn out in the direction of the optical axis for adjusting the focal position of the zoom lens.

When the value of conditional expression (8) is below the upper limit, the composite refractive power of the first through third lenses can be kept it be properly, and it reduces the movement amount of the lenses for adjusting the focal position. In the meantime, when the value of conditional expression (8) is above the lower limit, the composite refractive power of the first through third lenses becomes not to be excessively great and it controls the aberration change caused when the focal position is adjusted. More preferably, the following conditional expression (8') is met.

$$0.8 < f123/f < 1.3 \qquad (8')$$

In the above image pickup lens, it is preferable that each of the first to fifth lenses is formed of a plastic material.

In recent years, under the purpose of downsizing of an overall solid-state image pickup apparatus, there has been developed a solid-state image pickup element with a smaller pixel pitch, resulting in a smaller size of an image pickup surface, compared with a solid-state image pickup element having the same number of pixels. In the image pickup lens for the solid-state image pickup element having a small-sized image pickup surface, a focal length of the total optical system is requested to be relatively short, which makes a curvature radius and the outside diameter of each lens in the image pickup lens to be considerably small. Therefore, when employing plastic lenses manufactured by injection molding for all lenses in the image pickup lens, the image pickup lens can be mass-produced at lower cost even if each lens has a small curvature radius and a small outside diameter, compared with a glass lens manufactured through time-consuming grinding processing. In addition, it is possible to control wear and tear of a molding die because press temperature can be made low in the case of a plastic lens, resulting in reduction of the number of times for replacement of molding dies and of the number of times for maintenance, which realizes cost reduction.

Another embodiment of the present invention is an image pickup apparatus comprising: a solid-state image pickup element for photo-electrically converting an image of an object; and the above image pickup lens. An image pickup apparatus that is smaller in size and has higher property can be obtained by employing the image pickup lens representing the embodiment of the invention therein.

Another embodiment of the present invention is a mobile terminal comprising the above image pickup apparatus. A mobile terminal that is smaller in size and has higher property can be obtained by employing the image pickup using representing the embodiment of the invention therein.

The aforesaid embodiments of the invention makes it possible to provide an image pickup lens with five elements in which various aberrations are properly corrected in spite of its size that is smaller than a conventional type, and to provide an image pickup apparatus equipped with the image pickup lens and a mobile terminal equipped with the image pickup apparatus.

Embodiments of the invention will be explained in detail as follows, referring to the drawings. FIG. 1 is a perspective view of image pickup unit 50 relating to the present embodiment, and FIG. 2 is a diagram schematically showing a cross-section of an image pickup optical system of the image pickup unit 50 along the optical axis.

As shown in FIG. 1, the image pickup unit 50 is equipped with CMOS type image sensor 51, image pickup lens 10, substrate 52, and casing 53, which are integrally formed in one body. The CMOS type image sensor 51 is provided as a solid-state image pickup element having photoelectric conversion section 51a. The image pickup lens 10 forms an image of a photographic object on photoelectric conversion section 51a of the image sensor 51. The substrate 52 holds the image sensor 51 and has terminal for external connection 54 (that is also called external connection terminal) that transmits and receives electric signal. The casing 53 is provided as a lens barrel that has an aperture section for incidence of light from the photographic object side and is composed of a light shielding member.

Figure 2:
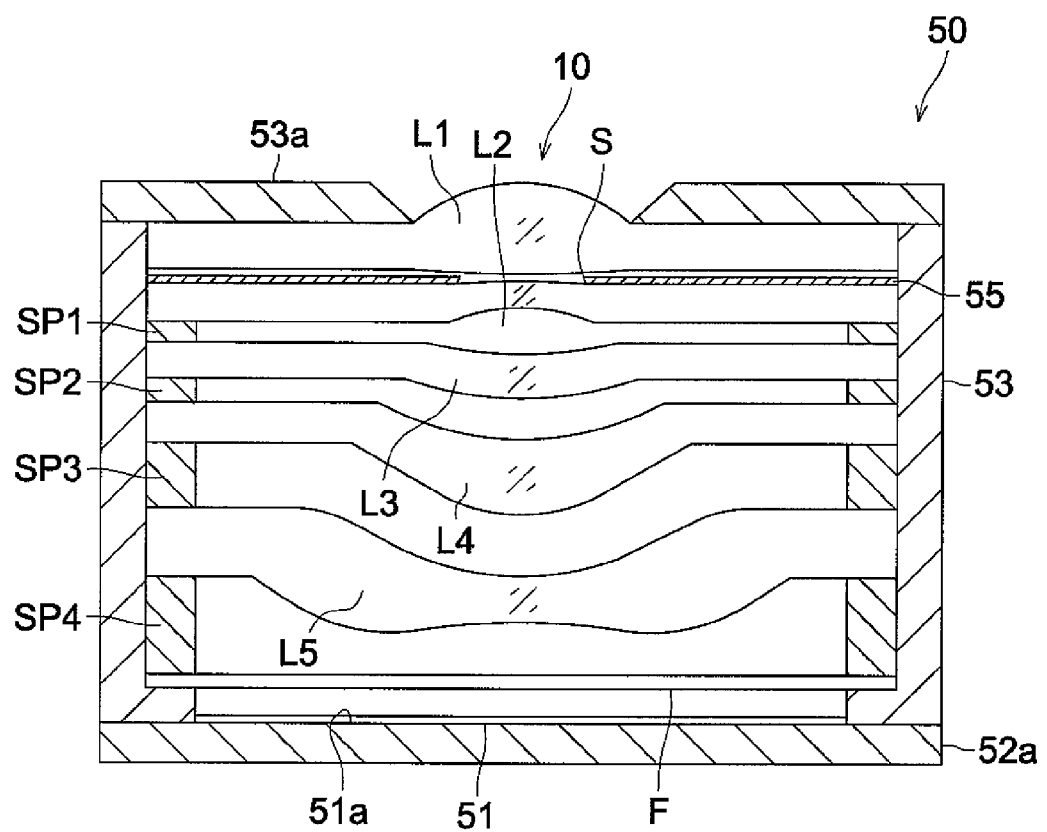
FIG. 2 is a diagram schematically showing a cross-section of image pickup unit 50 taken on a line of an optical axis of an image pickup optical system.

As is shown in FIG. 2, the image pickup element 51 includes the photoelectric conversion section 51a serving as a light receiving section on the central portion on a plane facing the light receiving side of the image sensor 51. On the photoelectric conversion section 51a, pixels (photoelectric conversion elements) are arranged on a two-dimensional basis. On the surroundings of the photoelectric conversion section 51a, signal processing circuits (which is no illustrated) are formed. The signal processing circuit of this kind is composed of a drive circuit section that drives each pixel in succession to obtain signal electric charges, A/D conversion section that converts each signal electric charge into a digital signal, and a signal processing section that forms image signal output by using this digital signal. Further, there are arranged many pads (not illustrated) around the outer edge of the plane on the light receiving side of the image sensor 51 and the pads are connected to substrate 52 through wires W. The image sensor 51 converts signal electric charge coming from the photoelectric conversion section 51a into image signals such as digital YUV signal, and outputs the signals to prescribed circuits on substrate 52 through wires W. In this case, Y represents luminance signal, U (=R−Y) represents color difference signal between red and luminance signal, and V (=B−Y) represents color difference signal between blue and luminance signals. In the mean time, the image sensor is not limited to the aforesaid CMOS type image sensor, and other ones such as CCD may also be used.

The substrate 52 is equipped with supporting flat plate 52a that supports thereon image pickup element 51 and casing 53 and with flexible substrate 52b whose one end portion is connected to the bottom surface (surface on the opposite side of image sensor 51) of the supporting flat plate 52a.

The supporting flat plate 52a has thereon many pads for signal transmission, to be connected with image sensor 51 through unillustrated wires, which is not illustrated.

In FIG. 1, the flexible substrate 52b has one end portion which is connected to supporting flat plate 52a, and the flexible substrate 52b connects the supporting flat plate 52a to an outer circuit (for example, a control circuit owned by an upper level apparatus equipped with an image pickup unit) through external connection terminal 54 that is provided on the other end portion. It enables the flexible substrate 52b to be applied a voltage and receive clock signals for driving image sensor 51 from outer circuits, and to output digital YUV signals to the outer circuits. Further, the flexible substrate 52b has flexibility or deformation property on its intermediate section in its longitudinal direction. The deformation gives the supporting flat plate 52a a degree of freedom in terms of a direction and arrangement of external connection terminal 54.

In FIG. 2, image pickup element 51 is provided on the supporting flat plate 52a of the substrate 52. Casing 53 is fixed on the surface where image sensor 51 is provided, so as to cover the image sensor 51. Namely, the casing 53 has a large opening on the image sensor 51 side, and the casing 53 extends so as to surround the image sensor 51. Further, flange portion 53a having a small aperture is formed on the other end portion of the casing 53 (end portion on the object side), and the end portion on the image sensor 51 side (end portion on the image side) is in contact with the supporting flat plate 52a to be fixed. The end portion of casing 53 on the image sensor 51 side may be in contact with an area surrounding the photoelectric conversion section 51a on the image sensor 51 to be fixed.

In casing 53, flange section 53a on which a small opening (aperture section for light incidence) is arranged to face the object side. In the inside of the casing 53, IR (infrared rays) blocking filter F is arranged to be fixed between image pickup lens 10 and image sensor 51.

The image pickup lens 10 includes, in this order from the object side, first lens L1 with a positive refractive power having the convex surface facing the object side, aperture stop S, second lens L2 with a negative refractive power having the concave surface facing the image side, third lens L3 with a positive or negative refractive power, fourth meniscus lens L4 with a positive refractive power having the convex surface facing the image side, and fifth lens L5 with a negative refractive power having the concave surface facing the image side. The surface of the fifth lens on the image side is aspherical, and an inflection point is located at a position other than the intersection point of the surface of the fifth lens and the optical axis. The image pickup lens satisfies the following conditional expression.

$$1.50 < f1/f < 0.85 \quad (1)$$

In the expression, f1 is the focal length of the first lens L1, and if is the focal length of the entire image pickup lens. The lenses L1 through L5 are preferably made of plastics. It should be noted in passing that, in FIGS. 1 and 2, the upper side is assumed as the object side, and the lower side is assumed as the image side.

In the auto-focusing operation and the switching operation to/from the macro photograph mode, the focal point of the image pickup lens 10 is adjusted by moving the first lens L1 through third lens L3. The zoom lens satisfies the following conditional expression.

$$0.05 < d6/f < 0.20 \quad (7)$$

In the expression, d6 is the air distance along the optical axis between the third lens L3 and fourth lens L4.

The zoom lens can be provided with an external-light shielding mask at a position closer to the object than the first lens L1 to minimize the entry of unwanted light from the outside. The aperture stop S determines the F-number of the entire image pickup lens system.

Thin stop member 55 is arranged between the lenses L1 and L2 and has an opening constituting a stop on its central portion. With respect to the lenses L2 through L5 and IR cut filter F, spacers SP1 through SP4 are arranged between the flanges of the adjacent lenses and filter. This ensures that the lenses L2 through L5 and IR cut filter F are arranged at predetermined space intervals. The IR cut filter F is designed in an appropriate rectangular or circular structure, for example.

Operations of the aforesaid image pickup unit 50 will be explained. Each of FIGS. 3a and 3b shows how the image pickup unit 50 is installed in mobile phone 100 as a mobile terminal or an image pickup apparatus. Further, FIG. 4 is a block diagram of the mobile phone 100.

The image pickup unit 50 is arranged at a position corresponding to the lower portion of a liquid crystal display section in the mobile phone 100, so that the end surface of casing 53 on the object side faces the rear of the mobile phone 100 (see FIG. 3b).

External connecting terminal 54 (represented as an arrow mark in FIG. 4) of the image pickup apparatus 50 is connected to the controller 101 of the mobile phone 100, and the image signals such as the luminance signal and the color difference signal are outputted to the controller 101.

Figure 4:
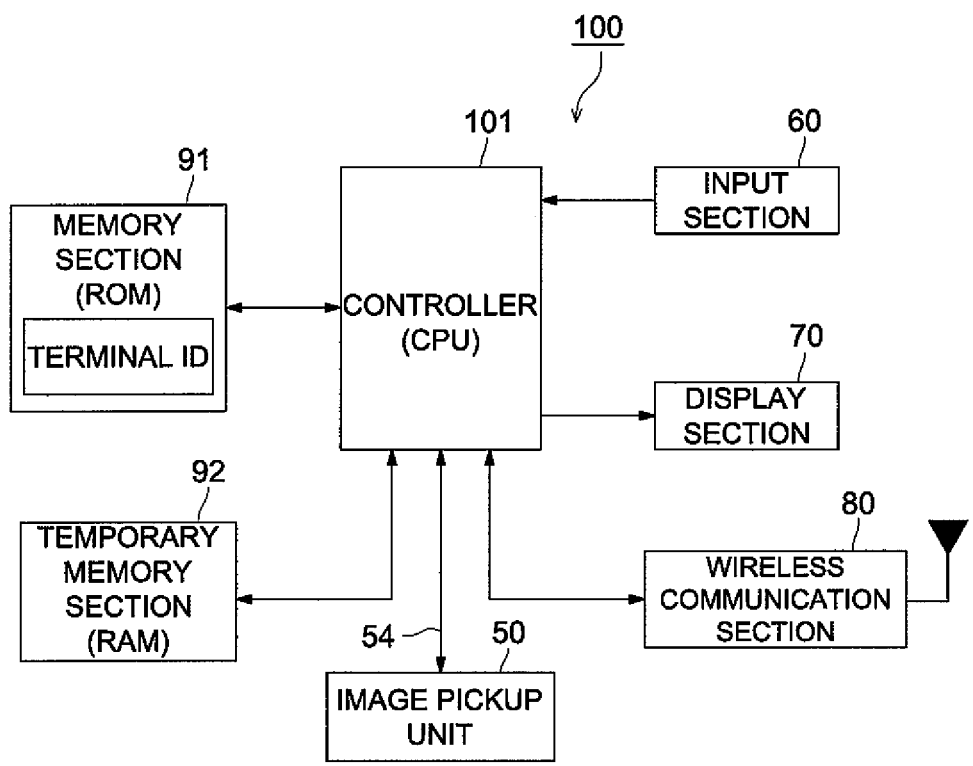
FIG. 4 is a control block diagram of a mobile phone shown in FIG. 3a and FIG. 3b.

On the one hand, as shown in FIG. 4, the mobile phone 100 is provided with controller (CPU) 101, input section 60, liquid crystal display section 70, wireless communication section 80, memory section (ROM) 91, and temporary memory section (RAM) 92. The controller (CPU) 101 generally controls each section together and executes programs corresponding to various processing. The input section 60 is provided for indicating and inputting numbers. The liquid crystal display section 70 displays acquired images in addition to prescribed data. The wireless communication section 80 is provided for realizing various kinds of information communication to the external server. The memory section (ROM) 91 stores the system programs of the mobile phone 100, the various processing programs, and data such as terminal ID. The a temporary memory section (RAM) 92 is provided as a working area, and temporarily stores the various processing programs and data operated by the controller 101 and processed data, image data acquired by the image pickup unit 50.

Further, the image signal inputted from the image pickup apparatus 50 is stored in the memory section 91 by the controller 101 of the mobile phone 100, is displayed on the display section 70, and further is transmitted to the outside as the image information through the wireless communication section 80.

EXAMPLES

Examples of image pickup lenses applied to the aforesaid embodiments will be shown below. The following symbols are used in the respective examples.

f: Focal length of the total system of the image pickup lens
fB: Back focus
F: F-number
2Y: Diagonal length of image pickup surface of solid-state image pickup element (Diagonal length on rectangular effective pixel area of solid-state image pickup element)
ENTP: Entrance pupil position (Distance from the first surface to entrance pupil position)
EXTP: Emergence pupil position (Distance from image plane to the emergence pupil position)
H1: Front side principal point position (Distance from the first surface to front side principal point position)
H2: Rear side principal point position (Distance from the last surface to rear side principal point position)
R: Curvature radius of refractive surface
D: Surface distance on the optical axis
Nd: Refractive index of lens material at normal temperature for d-line
vd: Abbe number of lens material In each Example, an asterisk (*) following each surface number means an aspheric surface and the shape of the aspheric surface is expressed by the following expression (10), where X-axis extends along the optical axis direction, the top of the surface is on the origin, and the height perpendicular to the optical axis is h.

$$X = \frac{h^2/R}{1+\sqrt{1-(1+K)h^2/R^2}} + \sum A_i h^i \quad (10)$$

In the aforesaid expression, Ai represents $i^{th}$ order aspheric surface coefficient, R represents a curvature radius, and K represents a conic constant.

In the following description (including lens data in Tables), an exponent for 10 is assumed to be expressed by using E (for example, 2.5×10-02 is expressed by 2.5E-02). Further, surface numbers in lens data are numbered by assuming the surface of the first lens facing the object as the first surface. Incidentally, each of all units of numerical values indicating lengths described in the Examples is mm.

Example 1

Lens data of an image pickup lens in Example 1 is shown in the following Table 1.

TABLE 1

Example 1
f = 5.35 mm fB = 0.35 mm F = 2.88 2Y = 7.056 mm
ENTP = 0.83 mm EXTP = −2.85 mm H1 = −2.77 mm
H2 = −5 mm

| Surface No. | R (mm) | D (mm) | Nd | vd | Effective radius (mm) |
|---|---|---|---|---|---|
| 1* | 1.868 | 0.99 | 1.54470 | 56.2 | 1.27 |
| 2* | −12.867 | 0.03 | | | 0.94 |
| 3 (Stop) | ∞ | 0.07 | | | 0.78 |
| 4* | −77.808 | 0.30 | 1.63200 | 23.4 | 0.78 |
| 5* | 3.130 | 0.52 | | | 0.87 |
| 6* | −7.802 | 0.49 | 1.63200 | 23.4 | 1.13 |
| 7* | −5.364 | 0.45 | | | 1.37 |
| 8* | −3.734 | 0.89 | 1.54470 | 56.2 | 1.63 |
| 9* | −1.726 | 0.67 | | | 1.94 |
| 10* | −3.739 | 0.50 | 1.54470 | 56.2 | 2.62 |
| 11* | 3.354 | 0.60 | | | 3.02 |
| 12 | ∞ | 0.15 | 1.51630 | 64.1 | 3.56 |
| 13 | ∞ | | | | 3.60 |

Aspheric surface coefficient

1st surface

| | |
|---|---|
| K = | 0.86114E−01 |
| A4 = | −0.36919E−02 |
| A6 = | −0.11430E−02 |
| A8 = | −0.29234E−02 |
| A10 = | 0.66419E−03 |
| A12 = | 0.35265E−03 |
| A14 = | −0.71249E−03 |

2nd surface

| | |
|---|---|
| K = | −0.30000E+02 |
| A4 = | 0.44743E−02 |
| A6 = | 0.59395E−02 |
| A8 = | −0.20900E−02 |
| A10 = | −0.87392E−02 |
| A12 = | −0.49763E−02 |
| A14 = | 0.69078E−02 |

4th surface

| | |
|---|---|
| K = | −0.30000E+02 |
| A4 = | 0.82710E−02 |
| A6 = | 0.41884E−01 |
| A8 = | −0.26557E−01 |
| A10 = | −0.68997E−02 |
| A12 = | 0.95617E−02 |
| A14 = | 0.73542E−04 |

TABLE 1-continued

Example 1
f = 5.35 mm fB = 0.35 mm F = 2.88 2Y = 7.056 mm
ENTP = 0.83 mm EXTP = −2.85 mm H1 = −2.77 mm
H2 = −5 mm 5th surface

| | |
|---|---|
| K = | −0.23003E+01 |
| A4 = | 0.22682E−01 |
| A6 = | 0.54370E−01 |
| A8 = | −0.32869E−01 |
| A10 = | 0.24226E−01 |
| A12 = | −0.12220E−02 |
| A14 = | 0.29419E−03 |

6th surface

| | |
|---|---|
| K = | 0.82463E+01 |
| A4 = | −0.43229E−01 |
| A6 = | −0.40332E−02 |
| A8 = | 0.15689E−01 |
| A10 = | −0.37481E−02 |
| A12 = | −0.88751E−02 |
| A14 = | 0.76279E−02 |

7th surface

| | |
|---|---|
| K = | 0.29935E+01 |
| A4 = | −0.22578E−01 |
| A6 = | 0.30410E−02 |
| A8 = | 0.21938E−02 |
| A10 = | −0.26762E−03 |
| A12 = | −0.14594E−03 |
| A14 = | 0.10590E−03 |

8th surface

| | |
|---|---|
| K = | 0.30708E+00 |
| A4 = | −0.85437E−02 |
| A6 = | 0.26674E−02 |
| A8 = | −0.68745E−03 |
| A10 = | 0.43849E−04 |
| A12 = | 0.89749E−04 |
| A14 = | 0.28962E−06 |

9th surface

| | |
|---|---|
| K = | −0.35720E+01 |
| A4 = | −0.35914E−01 |
| A6 = | 0.10330E−01 |
| A8 = | −0.20492E−02 |
| A10 = | 0.36205E−03 |
| A12 = | −0.32677E−05 |
| A14 = | −0.74676E−06 |

10th surface

| | |
|---|---|
| K = | −0.20269E+01 |
| A4 = | −0.35375E−01 |
| A6 = | 0.93988E−02 |
| A8 = | −0.40696E−03 |
| A10 = | −0.14538E−03 |
| A12 = | 0.26796E−04 |
| A14 = | −0.14283E−05 |

11th surface

| | |
|---|---|
| K = | −0.21437E+02 |
| A4 = | −0.29215E−01 |
| A6 = | 0.49291E−02 |
| A8 = | −0.68365E−03 |
| A10 = | 0.62355E−04 |
| A12 = | −0.44044E−05 |
| A14 = | 0.18806E−06 |

Single lens data

| Lens | Starting surface | Focal length (mm) |
|---|---|---|
| 1 | 1 | 3.067 |
| 2 | 4 | −4.754 |
| 3 | 6 | 25.192 |
| 4 | 8 | 5.097 |
| 5 | 10 | −3.167 |

Figure 5:
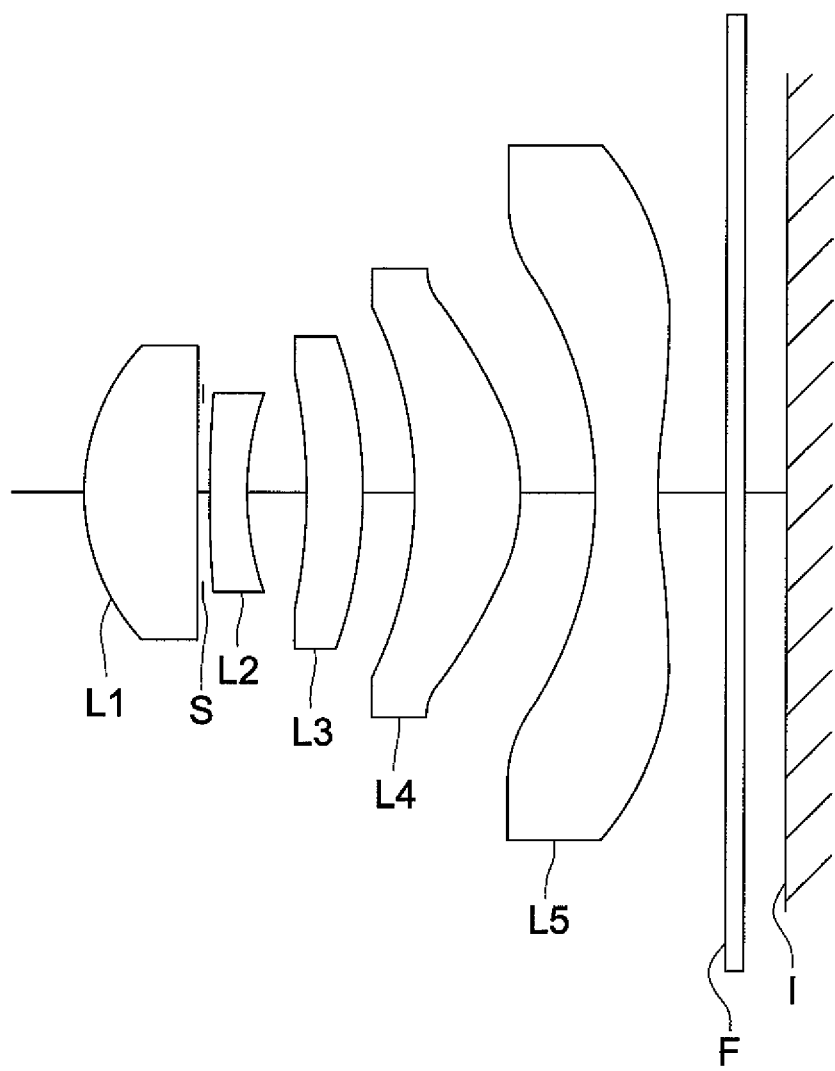
FIG. 5 is a sectional view in the direction of the optical axis of the image pickup lens in Example 1.
Figure 6A:
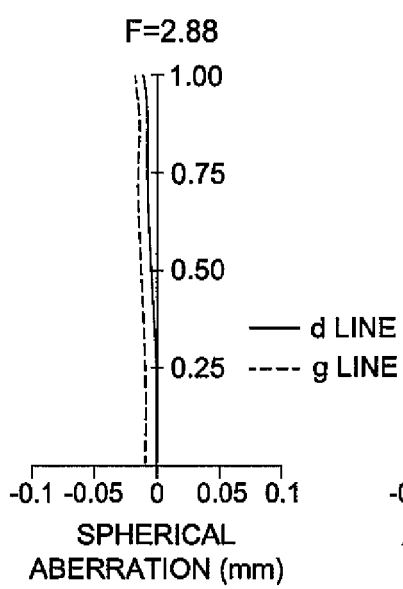
FIGS. 6a through 6d show aberration diagrams in Example 1 including spherical aberration, astigmatism, distortion, and meridional coma, respectively.
Figure 6B:
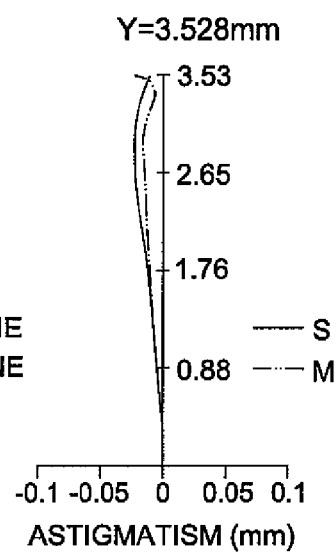
Figure 6C:
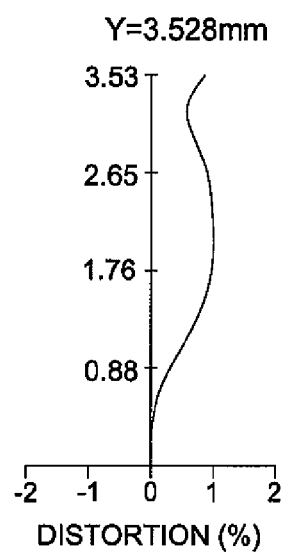
Figure 6D:
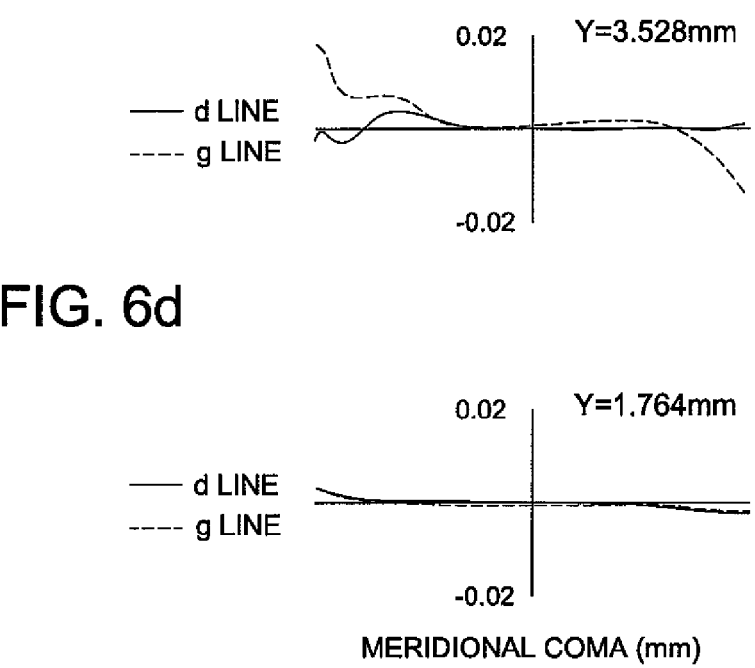

FIG. 5 is a cross sectional view of the lens in Example 1. FIG. 5 shows first lens L1, second lens L2, third lens L3, fourth lens L4, fifth lens L5, aperture stop S, imaging surface I, and parallel flat plate F. The second lens L2 includes an image side surface in an aspheric shape on which the negative refractive power is reduced as one goes from the optical axis toward the periphery. The third lens L3 has a positive refractive power and is in a meniscus shape whose convex surface faces the image side. The fourth lens L4 is in a meniscus shape whose convex surface faces the image side, and the image side surface of the fourth lens is in an aspheric surface on which the positive refractive power is reduced as one goes from the optical axis toward the periphery. The fifth lens L5 includes an aspheric surface facing the image side, and the surface includes an inflection point located on an area excluding the intersection point of the optical axis and the image side surface of the fifth lens. As for the parallel flat plate F, an optical low-pass filter, IR cut filter or sealed glass such as a solid image pickup element is assumed.

FIGS. 6a through 6d are diagrams of aberrations (spherical aberration, astigmatism, distortion and meridional coma, respectively) of the image pickup lens shown in Example 1. In the following diagrams of aberrations, solid lines correspond to d line and dotted lines correspond to g line in the diagram of spherical aberration, while, solid lines correspond to a suggital image surface and dotted lines correspond to a meridional image surface in the diagram of astigmatism.

The present Example employs a plastic material for all lenses, and is designed to move the first through third lenses as one body as the operation that the lenses in the image pickup lens are partially moved to be drawn out for the auto-focusing operation and the switching operation to/from the macro photograph mode.

Example 2

Lens data of an image pickup lens in Example 2 is shown in the following Table 2.

TABLE 2

Example 2
f = 5.54 mm fB = 0.66 mm F = 2.88 2Y = 7.056 mm
ENTP = 0.82 mm EXTP = −2.97 mm H1 = −2.09 mm
H2 = −4.88 mm

| Surface No. | R (mm) | D (mm) | Nd | vd | Effective radius (mm) |
|---|---|---|---|---|---|
| 1* | 1.720 | 0.96 | 1.54470 | 56.2 | 1.25 |
| 2* | −23.558 | 0.03 | | | 0.95 |
| 3 (Stop) | ∞ | 0.07 | | | 0.80 |
| 4* | 47.467 | 0.30 | 1.63200 | 23.4 | 0.82 |
| 5* | 2.945 | 0.61 | | | 0.87 |
| 6* | −6.119 | 0.64 | 1.63200 | 23.4 | 1.07 |
| 7* | −5.324 | 0.36 | | | 1.48 |
| 8* | −1.991 | 0.68 | 1.54470 | 56.2 | 1.66 |
| 9* | −1.322 | 0.45 | | | 1.94 |
| 10* | −14.605 | 0.50 | 1.54470 | 56.2 | 2.67 |
| 11* | 2.385 | 0.60 | | | 2.92 |
| 12 | ∞ | 0.15 | 1.51630 | 64.1 | 3.46 |
| 13 | ∞ | | | | 3.51 |

Aspheric surface coefficient

1st surface

K = 0.53402E−01
A4 = −0.45821E−02
A6 = −0.41569E−02
A8 = −0.31982E−02

TABLE 2-continued

Example 2
f = 5.54 mm fB = 0.66 mm F = 2.88 2Y = 7.056 mm
ENTP = 0.82 mm EXTP = −2.97 mm H1 = −2.09 mm
H2 = −4.88 mm

A10 = 0.60924E−03
A12 = −0.73947E−03
A14 = −0.55630E−03

2nd surface

K = 0.30000E+02
A4 = −0.11722E−01
A6 = 0.64982E−02
A8 = 0.13633E−02
A10 = −0.72007E−02
A12 = −0.15553E−02
A14 = 0.19025E−02

4th surface

K = −0.30000E+02
A4 = 0.32885E−02
A6 = 0.44481E−01
A8 = −0.19144E−01
A10 = 0.78797E−02
A12 = −0.37681E−03
A14 = 0.10763E−03

5th surface

K = −0.65507E+00
A4 = 0.29332E−01
A6 = 0.55075E−01
A8 = −0.21644E−01
A10 = 0.10862E−01
A12 = 0.20760E−01
A14 = −0.10010E−02

6th surface

K = 0.70484E+01
A4 = −0.60050E−01
A6 = −0.27703E−01
A8 = 0.72650E−02
A10 = −0.51157E−02
A12 = −0.43306E−02
A14 = −0.68395E−02

7th surface

K = 0.11434E+02
A4 = −0.19137E−01
A6 = −0.95346E−02
A8 = 0.45815E−02
A10 = 0.18352E−04
A12 = −0.98397E−03
A14 = 0.20748E−03

8th surface

K = −0.15781E+01
A4 = −0.63011E−02
A6 = 0.17851E−02
A8 = 0.81541E−03
A10 = 0.45137E−04
A12 = −0.12833E−04
A14 = −0.33164E−05

9th surface

K = −0.28206E+01
A4 = −0.36014E−01
A6 = 0.17500E−01
A8 = −0.27665E−02
A10 = 0.35659E−03
A12 = −0.12952E−04
A14 = −0.44673E−05

10th surface

K = 0.14737E+02
A4 = −0.39323E−01
A6 = 0.10290E−01
A8 = −0.52607E−03
A10 = −0.19505E−03
A12 = 0.37292E−04
A14 = −0.19742E−05

TABLE 2-continued

Example 2
f = 5.54 mm fB = 0.66 mm F = 2.88 2Y = 7.056 mm
ENTP = 0.82 mm EXTP = −2.97 mm H1 = −2.09 mm
H2 = −4.88 mm 11th surface

| | |
|---|---|
| K = | −0.13974E+02 |
| A4 = | −0.39548E−01 |
| A6 = | 0.68986E−02 |
| A8 = | −0.90503E−03 |
| A10 = | 0.80310E−04 |
| A12 = | −0.59310E−05 |
| A14 = | 0.27988E−06 |

Single lens data

| Lens | Initial surface | Focal length (mm) |
|---|---|---|
| 1 | 1 | 2.983 |
| 2 | 4 | −4.981 |
| 3 | 6 | 49.323 |
| 4 | 8 | 5.304 |
| 5 | 10 | −3.726 |

FIG. 7 is a cross sectional view of the lens in Example 2. FIG. 7 shows first lens L1, second lens L2, third lens L3, fourth lens L4, fifth lens L5, aperture stop S, imaging surface 1, and parallel flat plate F. The second lens L2 includes an image side surface in an aspheric shape on which the negative refractive power is reduced as one goes from the optical axis toward the periphery. The third lens L3 has a positive refractive power and is in a meniscus shape whose convex surface faces the image side. The fourth lens L4 is in a meniscus shape whose convex surface faces the image side, and the image side surface of the fourth lens is in an aspheric surface on which the positive refractive power is reduced as one goes from the optical axis toward the periphery. The fifth lens L5 includes an aspheric surface facing the image side, and the surface includes an inflection point located on an area excluding the intersection point of the optical axis and the image side surface of the fifth lens. As for the parallel flat plate F, an optical low-pass filter, IR cut filter or sealed glass such as a solid image pickup element is assumed.

FIGS. 8a through 8d are diagrams of aberrations (spherical aberration, astigmatism, distortion and meridional coma, respectively) of the image pickup lens shown in Example 2.

The present Example employs a plastic material for all lenses, and is designed to move the first through third lenses as one body as the operation that the lenses in the image pickup lens are partially moved to be drawn out for the auto-focusing operation and the switching operation to/from the macro photograph mode.

Example 3

Lens data of an image pickup lens in Example 3 is shown in the following Table 3.

TABLE 3

Example 3
f = 4.81 mm fB = 0.5 mm F = 2.88 2Y = 7.056 mm
ENTP = 0.66 mm EXTP = −2.66 mm H1 = −1.84 mm
H2 = −4.31 mm

| Surface No. | R (mm) | D (mm) | Nd | vd | Effective radius (mm) |
|---|---|---|---|---|---|
| 1* | 1.792 | 0.78 | 1.54470 | 56.2 | 1.10 |
| 2* | 57.549 | 0.05 | | | 0.78 |
| 3 (Stop) | ∞ | 0.05 | | | 0.71 |
| 4* | 15.461 | 0.30 | 1.63200 | 23.4 | 0.75 |
| 5* | 2.544 | 0.41 | | | 0.86 |
| 6* | 6.186 | 0.36 | 1.63200 | 23.4 | 1.16 |
| 7* | 8.531 | 0.64 | | | 1.35 |
| 8* | −9.117 | 1.06 | 1.54470 | 56.2 | 1.94 |
| 9* | −1.182 | 0.40 | | | 2.19 |
| 10* | −2.455 | 0.45 | 1.54470 | 56.2 | 2.87 |
| 11* | 2.057 | 0.56 | | | 3.21 |
| 12 | ∞ | 0.15 | 1.51630 | 64.1 | 3.49 |
| 13 | ∞ | | | | 3.53 |

Aspheric surface coefficient

1st surface

| | |
|---|---|
| K = | 0.28280E+00 |
| A4 = | 0.18157E−02 |
| A6 = | 0.36321E−02 |
| A8 = | 0.25085E−02 |
| A10 = | 0.36227E−03 |
| A12 = | 0.15340E−02 |
| A14 = | 0.15062E−03 |

2nd surface

| | |
|---|---|
| K = | 0.50000E+02 |
| A4 = | 0.38939E−01 |
| A6 = | 0.11307E−01 |
| A8 = | 0.17605E−02 |
| A10 = | −0.62245E−02 |
| A12 = | −0.21671E−01 |
| A14 = | 0.17162E−01 |

4th surface

| | |
|---|---|
| K = | −0.50000E+02 |
| A4 = | −0.87875E−02 |
| A6 = | 0.64359E−01 |
| A8 = | −0.91504E−01 |
| A10 = | 0.29139E−01 |
| A12 = | −0.24095E−02 |
| A14 = | 0.97740E−04 |

5th surface

| | |
|---|---|
| K = | −0.66081E+01 |
| A4 = | 0.13885E−01 |
| A6 = | 0.69097E−01 |
| A8 = | −0.85538E−01 |
| A10 = | 0.46544E−01 |
| A12 = | −0.77168E−02 |
| A14 = | 0.26204E−03 |

6th surface

| | |
|---|---|
| K = | −0.76395E+01 |
| A4 = | −0.63122E−01 |
| A6 = | 0.18164E−02 |
| A8 = | 0.90117E−02 |
| A10 = | −0.67614E−03 |
| A12 = | 0.50409E−02 |
| A14 = | −0.38787E−02 |

7th surface

| | |
|---|---|
| K = | −0.19178E+02 |
| A4 = | −0.43032E−01 |
| A6 = | −0.10803E−02 |
| A8 = | −0.18993E−02 |
| A10 = | 0.52273E−02 |
| A12 = | 0.14113E−02 |
| A14 = | −0.10676E−02 |

8th surface

| | |
|---|---|
| K = | −0.15420E+01 |
| A4 = | −0.13389E−01 |
| A6 = | 0.10698E−01 |
| A8 = | −0.48204E−02 |
| A10 = | −0.29713E−03 |

TABLE 3-continued

Example 3
f = 4.81 mm fB = 0.5 mm F = 2.88 2Y = 7.056 mm
ENTP = 0.66 mm EXTP = −2.66 mm H1 = −1.84 mm
H2 = −4.31 mm

| | |
|---|---|
| A12 = | 0.54057E−03 |
| A14 = | −0.72497E−04 |

9th surface

| | |
|---|---|
| K = | −0.36020E+01 |
| A4 = | −0.38865E−01 |
| A6 = | 0.19925E−01 |
| A8 = | −0.18305E−02 |
| A10 = | −0.40295E−04 |
| A12 = | −0.91416E−04 |
| A14 = | 0.15057E−04 |

10th surface

| | |
|---|---|
| K = | −0.14109E+02 |
| A4 = | −0.29404E−01 |
| A6 = | 0.96542E−02 |
| A8 = | −0.42471E−03 |
| A10 = | −0.16082E−03 |
| A12 = | 0.23786E−04 |
| A14 = | −0.10116E−05 |

11th surface

| | |
|---|---|
| K = | −0.13938E+02 |
| A4 = | −0.24657E−01 |
| A6 = | 0.47086E−02 |
| A8 = | −0.79679E−03 |
| A10 = | 0.79104E−04 |
| A12 = | −0.32046E−05 |
| A14 = | 0.15825E−07 |

Single lens data

| Lens | Starting surface | Focal length (mm) |
|---|---|---|
| 1 | 1 | 3.379 |
| 2 | 4 | −4.863 |
| 3 | 6 | 33.628 |
| 4 | 8 | 2.382 |
| 5 | 10 | −1.985 |

FIG. 9 is a cross sectional view of the lens in Example 3. FIG. 9 shows first lens L1, second lens L2, third lens L3, fourth lens L4, fifth lens L5, aperture stop S, imaging surface I, and parallel flat plate F. The second lens L2 includes an image side surface in an aspheric shape on which the negative refractive power is reduced as one goes from the optical axis toward the periphery. The third lens L3 has a positive refractive power and is in a meniscus shape whose convex surface faces the object side. The fourth lens L4 is in a meniscus shape whose convex surface faces the image side, and the image side surface of the fourth lens is in an aspheric surface on which the positive refractive power is reduced as one goes from the optical axis toward the periphery. The fifth lens L5 includes an aspheric surface facing the image side, and the surface includes an inflection point located on an area excluding the intersection point of the optical axis and the image side surface of the fifth lens. As for the parallel flat plate F, an optical low-pass filter, IR cut filter or sealed glass such as a solid image pickup element is assumed.

FIGS. 10a through 10d are diagrams of aberrations (spherical aberration, astigmatism, distortion and meridional coma, respectively) of the image pickup lens shown in Example 3.

The present Example employs a plastic material for all lenses, and is designed to move the first through fifth lenses as one body as the operation that all the lenses in the image pickup lens are moved to be drawn out for the auto-focusing operation and the switching operation to/from the macro photograph mode.

Example 4

Lens data of an image pickup lens in Example 4 is shown in the following Table 4.

TABLE 4

Example 4
f = 5.18 mm fB = 0.42 mm F = 2.88 2Y = 7.056 mm
ENTP = 0.7 mm EXTP = −2.8 mm H1 = −2.45 mm H2 = −4.76 mm

| Surface No. | R (mm) | D (mm) | Nd | vd | Effective radius (mm) |
|---|---|---|---|---|---|
| 1* | 1.990 | 0.85 | 1.54470 | 56.2 | 1.20 |
| 2* | −23.027 | 0.03 | | | 0.89 |
| 3 (Stop) | ∞ | 0.07 | | | 0.78 |
| 4* | 8.833 | 0.39 | 1.63200 | 23.4 | 0.80 |
| 5* | 2.328 | 0.59 | | | 0.91 |
| 6* | 352.665 | 0.52 | 1.63200 | 23.4 | 1.28 |
| 7* | −32.217 | 0.32 | | | 1.58 |
| 8* | −7.160 | 0.92 | 1.54470 | 56.2 | 1.98 |
| 9* | −1.730 | 0.64 | | | 2.18 |
| 10* | −5.139 | 0.50 | 1.54470 | 56.2 | 2.61 |
| 11* | 2.463 | 0.60 | | | 3.00 |
| 12 | ∞ | 0.15 | 1.51630 | 64.1 | 3.43 |
| 13 | ∞ | | | | 3.47 |

Aspheric surface coefficient

1st surface

| | |
|---|---|
| K = | 0.13376E+00 |
| A4 = | −0.28477E−02 |
| A6 = | −0.88702E−03 |
| A8 = | −0.34504E−02 |
| A10 = | 0.13424E−02 |
| A12 = | 0.77721E−03 |
| A14 = | −0.89811E−03 |

2nd surface

| | |
|---|---|
| K = | 0.11553E+02 |
| A4 = | 0.42804E−02 |
| A6 = | 0.15894E−02 |
| A8 = | −0.21334E−02 |
| A10 = | −0.34776E−02 |
| A12 = | 0.50375E−02 |
| A14 = | −0.42310E−02 |

4th surface

| | |
|---|---|
| K = | 0.15515E+02 |
| A4 = | −0.24917E−01 |
| A6 = | 0.28126E−01 |
| A8 = | −0.17672E−01 |
| A10 = | 0.80298E−02 |
| A12 = | −0.33599E−02 |
| A14 = | 0.74181E−04 |

5th surface

| | |
|---|---|
| K = | −0.36873E+01 |
| A4 = | 0.10798E−01 |
| A6 = | 0.41727E−01 |
| A8 = | −0.24303E−01 |
| A10 = | 0.11714E−01 |
| A12 = | 0.11284E−02 |
| A14 = | 0.28539E−03 |

6th surface

| | |
|---|---|
| K = | −0.30000E+02 |
| A4 = | −0.49753E−01 |
| A6 = | 0.13057E−02 |
| A8 = | 0.51214E−02 |
| A10 = | −0.23916E−03 |
| A12 = | 0.23470E−03 |
| A14 = | −0.21080E−03 |

TABLE 4-continued

Example 4
f = 5.18 mm fB = 0.42 mm F = 2.88 2Y = 7.056 mm
ENTP = 0.7 mm EXTP = −2.8 mm H1 = −2.45 mm H2 = −4.76 mm 7th surface

| | |
|---|---|
| K = | 0.30000E+02 |
| A4 = | −0.32753E−01 |
| A6 = | 0.68366E−03 |
| A8 = | 0.19479E−02 |
| A10 = | 0.83823E−03 |
| A12 = | −0.14388E−04 |
| A14 = | −0.14878E−03 |

8th surface

| | |
|---|---|
| K = | −0.98552E+01 |
| A4 = | 0.73676E−02 |
| A6 = | 0.22087E−02 |
| A8 = | 0.53270E−03 |
| A10 = | −0.84753E−04 |
| A12 = | −0.26378E−04 |
| A14 = | 0.91558E−06 |

9th surface

| | |
|---|---|
| K = | −0.40175E+01 |
| A4 = | −0.21575E−01 |
| A6 = | 0.14621E−01 |
| A8 = | −0.22869E−02 |
| A10 = | 0.25379E−03 |
| A12 = | −0.11607E−04 |
| A14 = | −0.16254E−05 |

10th surface

| | |
|---|---|
| K = | −0.15023E+01 |
| A4 = | −0.39861E−01 |
| A6 = | 0.88885E−02 |
| A8 = | −0.34555E−03 |
| A10 = | −0.13035E−03 |
| A12 = | 0.28002E−04 |
| A14 = | −0.17380E−05 |

11th surface

| | |
|---|---|
| K = | −0.12346E+02 |
| A4 = | −0.32180E−01 |
| A6 = | 0.52829E−02 |
| A8 = | −0.74278E−03 |
| A10 = | 0.64566E−04 |
| A12 = | −0.37112E−05 |
| A14 = | 0.13660E−06 |

Single lens data

| Lens | Starting surface | Focal length (mm) |
|---|---|---|
| 1 | 1 | 3.404 |
| 2 | 4 | −5.119 |
| 3 | 6 | 46.734 |
| 4 | 8 | 3.952 |
| 5 | 10 | −2.987 |

Figure 11:
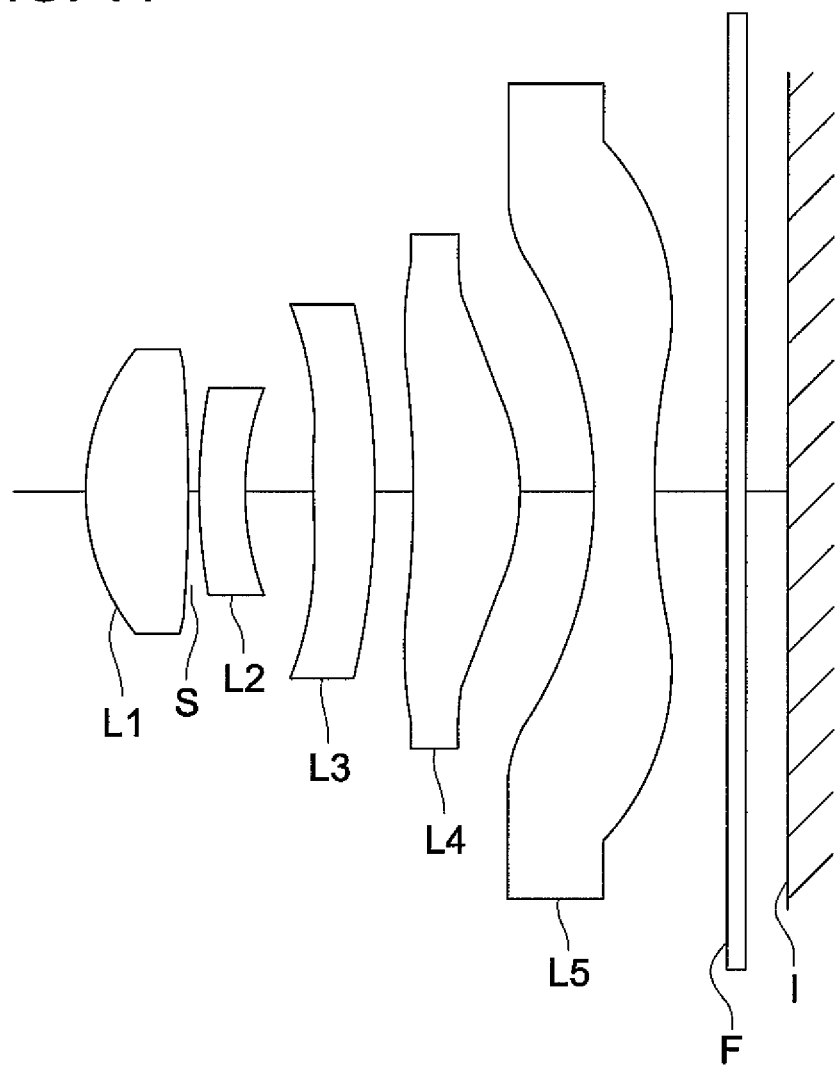
FIG. 11 is a sectional view in the direction of the optical axis of the image pickup lens in Example 4.
Figure 12A:
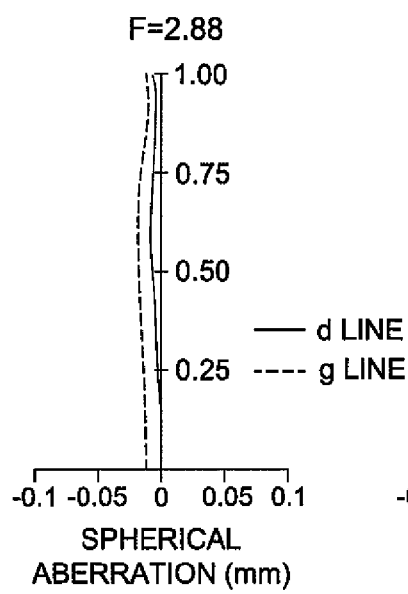
FIGS. 12a through FIG. 12d show aberration diagrams in Example 4 including spherical aberration, astigmatism, distortion, and meridional coma, respectively.
Figure 12B:
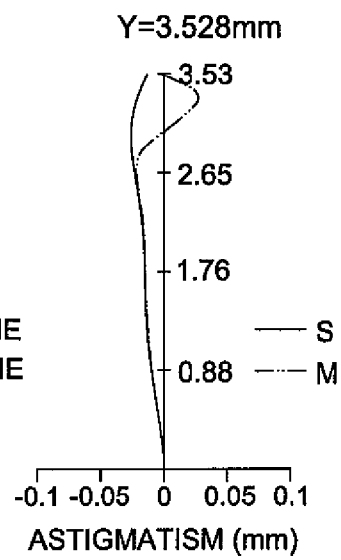
Figure 12C:
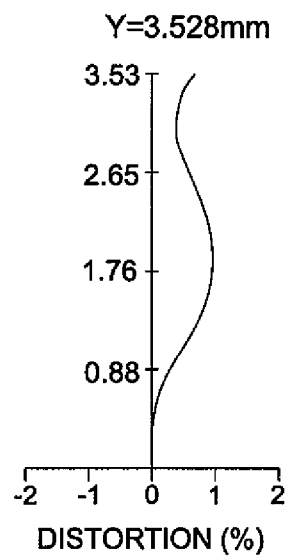
Figure 12D:
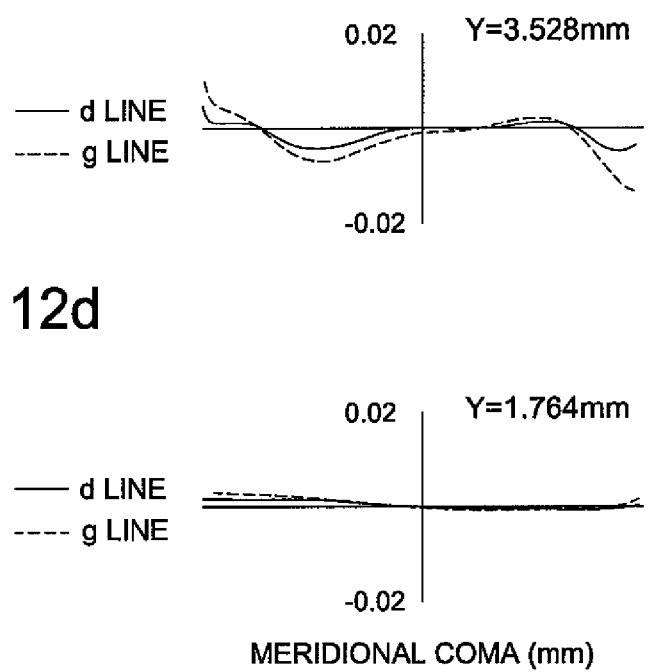

FIG. 11 is a cross sectional view of the lens in Example 4. FIG. 11 shows first lens L1, second lens L2, third lens L3, fourth lens L4, fifth lens L5, aperture stop S, imaging surface I, and parallel flat plate F. The second lens L2 includes an image side surface in an aspheric shape on which the negative refractive power is reduced as one goes from the optical axis toward the periphery. The third lens L3 has a positive refractive power and is in a biconvex shape. The fourth lens L4 is in a meniscus shape whose convex surface faces the image side, and the image side surface of the fourth lens is in an aspheric surface on which the positive refractive power is reduced as one goes from the optical axis toward the periphery. The fifth lens L5 includes an aspheric surface facing the image side, and the surface includes an inflection point located on an area excluding the intersection point of the optical axis and the image side surface of the fifth lens. As for the parallel flat plate F, an optical low-pass filter, IR cut filter or sealed glass such as a solid image pickup element is assumed.

FIGS. 12a through 12d are diagrams of aberrations (spherical aberration, astigmatism, distortion and meridional coma, respectively) of the image pickup lens shown in Example 4.

The present Example employs a plastic material for all lenses, and is designed to move only the first lens as the operation that the lenses in the image pickup lens are partially moved to be drawn out for the auto-focusing operation and the switching operation to/from the macro photograph mode.

Example 5

Lens data of an image pickup lens in Example 5 is shown in the following Table 5.

TABLE 5

Example 5
f = 5.31 mm fB = 0.33 mm F = 2.88 2Y = 7.056 mm
ENTP = 0.74 mm EXTP = −2.89 mm H1 = −2.73 mm H2 = −4.98 mm

| Surface No. | R (mm) | D (mm) | Nd | νd | Effective radius (mm) |
|---|---|---|---|---|---|
| 1* | 2.080 | 0.92 | 1.58910 | 61.1 | 1.23 |
| 2* | −19.374 | 0.03 | | | 0.92 |
| 3 (Stop) | ∞ | 0.07 | | | 0.79 |
| 4* | 10.834 | 0.30 | 1.63200 | 23.4 | 0.81 |
| 5* | 2.647 | 0.52 | | | 0.88 |
| 6* | −3.960 | 0.49 | 1.58300 | 30.0 | 1.10 |
| 7* | −3.278 | 0.50 | | | 1.33 |
| 8* | −4.546 | 0.85 | 1.54470 | 56.2 | 1.73 |
| 9* | −2.015 | 0.74 | | | 2.01 |
| 10* | −4.033 | 0.50 | 1.54470 | 56.2 | 2.58 |
| 11* | 3.565 | 0.60 | | | 3.00 |
| 12 | ∞ | 0.15 | 1.51630 | 64.1 | 3.49 |
| 13 | ∞ | | | | 3.53 |

Aspheric surface coefficient

1st surface

| | |
|---|---|
| K = | 0.11341E−01 |
| A4 = | −0.61902E−02 |
| A6 = | −0.18797E−02 |
| A8 = | −0.43872E−02 |
| A10 = | 0.80988E−03 |
| A12 = | 0.33843E−03 |
| A14 = | −0.68958E−03 |

2nd surface

| | |
|---|---|
| K = | 0.30000E+02 |
| A4 = | −0.74760E−02 |
| A6 = | 0.19458E−02 |
| A8 = | −0.21306E−03 |
| A10 = | −0.63155E−02 |
| A12 = | −0.26654E−02 |
| A14 = | 0.21493E−02 |

4th surface

| | |
|---|---|
| K = | 0.30000E+02 |
| A4 = | −0.40856E−03 |
| A6 = | 0.36637E−01 |
| A8 = | −0.20027E−01 |
| A10 = | 0.13836E−02 |
| A12 = | −0.32676E−02 |
| A14 = | 0.73296E−04 |

5th surface

| | |
|---|---|
| K = | −0.14484E+01 |
| A4 = | 0.25927E−01 |
| A6 = | 0.46724E−01 |
| A8 = | −0.18136E−01 |
| A10 = | 0.18011E−01 |
| A12 = | −0.78087E−02 |

TABLE 5-continued

Example 5
f = 5.31 mm fB = 0.33 mm F = 2.88 2Y = 7.056 mm
ENTP = 0.74 mm EXTP = −2.89 mm H1 = −2.73 mm H2 = −4.98 mm

| | |
|---|---|
| A14 = | 0.29395E−03 |

6th surface

| | |
|---|---|
| K = | −0.41502E+01 |
| A4 = | −0.39354E−01 |
| A6 = | 0.78876E−02 |
| A8 = | 0.17539E−01 |
| A10 = | 0.84865E−03 |
| A12 = | −0.36872E−02 |
| A14 = | 0.29159E−02 |

7th surface

| | |
|---|---|
| K = | −0.12813E+01 |
| A4 = | −0.13758E−01 |
| A6 = | 0.53762E−02 |
| A8 = | 0.38944E−02 |
| A10 = | 0.14077E−02 |
| A12 = | 0.29753E−04 |
| A14 = | −0.41054E−03 |

8th surface

| | |
|---|---|
| K = | −0.10909E+02 |
| A4 = | −0.79294E−02 |
| A6 = | −0.46480E−03 |
| A8 = | 0.42122E−03 |
| A10 = | −0.32719E−05 |
| A12 = | −0.71697E−05 |
| A14 = | 0.62492E−05 |

9th surface

| | |
|---|---|
| K = | −0.53073E+01 |
| A4 = | −0.31125E−01 |
| A6 = | 0.11291E−01 |
| A8 = | −0.23761E−02 |
| A10 = | 0.29418E−03 |
| A12 = | −0.20198E−05 |
| A14 = | −0.40849E−06 |

10th surface

| | |
|---|---|
| K = | −0.38554E+01 |
| A4 = | −0.36045E−01 |
| A6 = | 0.90364E−02 |
| A8 = | −0.41276E−03 |
| A10 = | −0.14394E−03 |
| A12 = | 0.27236E−04 |
| A14 = | −0.14636E−05 |

11th surface

| | |
|---|---|
| K = | −0.23488E+02 |
| A4 = | −0.27845E−01 |
| A6 = | 0.50532E−02 |
| A8 = | −0.71653E−03 |
| A10 = | 0.62568E−04 |
| A12 = | −0.38441E−05 |
| A14 = | 0.14353E−06 |

Single lens data

| Lens | Starting surface | Focal length (mm) |
|---|---|---|
| 1 | 1 | 3.240 |
| 2 | 4 | −5.624 |
| 3 | 6 | 25.776 |
| 4 | 8 | 5.937 |
| 5 | 10 | −3.395 |

Figure 13:
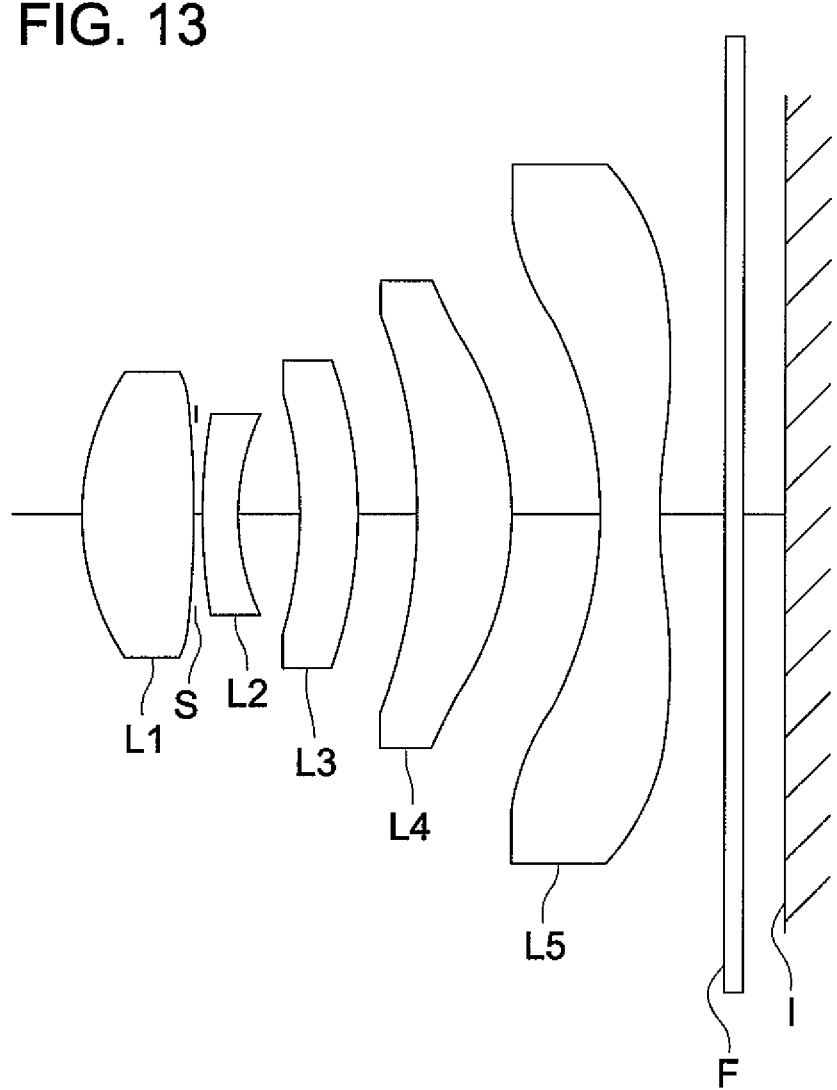
FIG. 13 is a sectional view in the direction of the optical axis of the image pickup lens in Example 5.

FIG. 13 is a cross sectional view of the lens in Example 5. FIG. 13 shows first lens L1, second lens L2, third lens L3, fourth lens L4, fifth lens L5, aperture stop S, imaging surface I, and parallel flat plate F. The second lens L2 includes an image side surface in an aspheric shape on which the negative refractive power is reduced as one goes from the optical axis toward the periphery. The third lens L3 has a positive refractive power and is in a meniscus shape whose convex surface faces the image side. The fourth lens L4 is in a meniscus shape whose convex surface faces the image side, and the image side surface of the fourth lens is in an aspheric surface on which the positive refractive power is reduced as one goes from the optical axis toward the periphery. The fifth lens L5 includes an aspheric surface facing the image side, and the surface includes an inflection point located on an area excluding the intersection point of the optical axis and the image side surface of the fifth lens. As for the parallel flat plate F, an optical low-pass filter, IR cut filter or sealed glass such as a solid image pickup element is assumed.

FIGS. 14a through 14d are diagrams of aberrations (spherical aberration, astigmatism, distortion and meridional coma, respectively) of the image pickup lens shown in Example 5.

The present Example employs a glass mold lens for the first lens and employs a plastic material for the second through fifth lenses, and is designed to move the first through third lenses as one body as the operation that the lenses in the image pickup lens are partially moved to be drawn out for the auto-focusing operation and the switching operation to/from the macro photograph mode.

Example 6

Lens data of an image pickup lens in Example 6 is shown in the following Table 6.

TABLE 6

Example 6
f = 5.22 mm fB = 0.44 mm F = 2.88 2Y = 7.056 mm
ENTP = 0.72 mm EXTP = −2.74 mm H1 = −2.63 mm H2 = −4.78 mm

| Surface No. | R (mm) | D (mm) | Nd | νd | Effective radius (mm) |
|---|---|---|---|---|---|
| 1* | 1.729 | 0.86 | 1.54470 | 56.2 | 1.19 |
| 2* | −20.800 | 0.03 | | | 0.92 |
| 3 (Stop) | ∞ | 0.07 | | | 0.77 |
| 4* | −21.488 | 0.30 | 1.63200 | 23.4 | 0.78 |
| 5* | 3.677 | 0.47 | | | 0.86 |
| 6* | −7.887 | 0.49 | 1.63200 | 23.4 | 1.07 |
| 7* | −6.594 | 0.59 | | | 1.29 |
| 8* | −4.090 | 0.76 | 1.54470 | 56.2 | 1.55 |
| 9* | −1.460 | 0.50 | | | 1.92 |
| 10* | −2.470 | 0.45 | 1.54470 | 56.2 | 2.62 |
| 11* | 3.551 | 0.60 | | | 2.93 |
| 12 | ∞ | 0.15 | 1.51630 | 64.1 | 3.43 |
| 13 | ∞ | | | | 3.47 |

Aspheric surface coefficient

1st surface

| | |
|---|---|
| K = | 0.63943E−01 |
| A4 = | −0.33617E−02 |
| A6 = | −0.60573E−03 |
| A8 = | −0.70508E−02 |
| A10 = | 0.20424E−02 |
| A12 = | 0.22804E−02 |
| A14 = | −0.31162E−02 |

2nd surface

| | |
|---|---|
| K = | −0.30000E+02 |
| A4 = | −0.60841E−02 |
| A6 = | 0.10661E−01 |
| A8 = | 0.11803E−02 |
| A10 = | −0.13577E−01 |
| A12 = | −0.12161E−01 |
| A14 = | 0.11602E−01 |

4th surface

| | |
|---|---|
| K = | −0.30000E+02 |
| A4 = | 0.12790E−01 |

TABLE 6-continued

Example 6
f = 5.22 mm fB = 0.44 mm F = 2.88 2Y = 7.056 mm
ENTP = 0.72 mm EXTP = −2.74 mm H1 = −2.63 mm H2 = −4.78 mm

| | |
|---|---|
| A6 = | 0.53609E−01 |
| A8 = | −0.30950E−01 |
| A10 = | −0.10729E−01 |
| A12 = | 0.23044E−01 |
| A14 = | −0.15764E−01 |
| 5th surface | |
| K = | −0.98249E+00 |
| A4 = | 0.31494E−01 |
| A6 = | 0.69027E−01 |
| A8 = | −0.36243E−01 |
| A10 = | 0.16717E−01 |
| A12 = | 0.38281E−01 |
| A14 = | −0.25688E−01 |
| 6th surface | |
| K = | 0.21294E+02 |
| A4 = | −0.63074E−01 |
| A6 = | −0.10415E−01 |
| A8 = | 0.28631E−01 |
| A10 = | −0.20777E−02 |
| A12 = | −0.12482E−01 |
| A14 = | 0.13343E−01 |
| 7th surface | |
| K = | 0.12399E+02 |
| A4 = | −0.44413E−01 |
| A6 = | 0.17926E−03 |
| A8 = | 0.24801E−02 |
| A10 = | 0.16956E−02 |
| A12 = | 0.10545E−02 |
| A14 = | −0.30496E−03 |
| 8th surface | |
| K = | 0.11912E+01 |
| A4 = | −0.17370E−01 |
| A6 = | −0.12267E−02 |
| A8 = | −0.13597E−02 |
| A10 = | −0.27798E−03 |
| A12 = | −0.15744E−04 |
| A14 = | 0.50323E−04 |
| 9th surface | |
| K = | −0.35985E+01 |
| A4 = | −0.28074E−01 |
| A6 = | 0.13549E−01 |
| A8 = | −0.26273E−02 |
| A10 = | 0.16011E−03 |
| A12 = | −0.15354E−04 |
| A14 = | 0.40283E−05 |
| 10th surface | |
| K = | −0.10262E+02 |
| A4 = | −0.33268E−01 |
| A6 = | 0.95151E−02 |
| A8 = | −0.42370E−03 |
| A10 = | −0.15647E−03 |
| A12 = | 0.25235E−04 |
| A14 = | −0.11601E−05 |
| 11th surface | |
| K = | −0.26980E+02 |
| A4 = | −0.27359E−01 |
| A6 = | 0.44330E−02 |
| A8 = | −0.68670E−03 |
| A10 = | 0.67313E−04 |
| A12 = | −0.40187E−05 |
| A14 = | 0.13746E−06 |

Single lens data

| Lens | Starting surface | Focal length (mm) |
|---|---|---|
| 1 | 1 | 2.971 |
| 2 | 4 | −4.945 |

TABLE 6-continued

Example 6
f = 5.22 mm fB = 0.44 mm F = 2.88 2Y = 7.056 mm
ENTP = 0.72 mm EXTP = −2.74 mm H1 = −2.63 mm H2 = −4.78 mm

| 3 | 6 | 55.485 |
|---|---|---|
| 4 | 8 | 3.782 |
| 5 | 10 | −2.605 |

FIG. 15 is a cross sectional view of the lens in Example 6. FIG. 15 shows first lens L1, second lens L2, third lens L3, fourth lens L4, fifth lens L5, aperture stop S, imaging surface I, and parallel flat plate F. The second lens L2 includes an image side surface in an aspheric shape on which the negative refractive power is reduced as one goes from the optical axis toward the periphery. The third lens L3 has a positive refractive power and is in a meniscus shape whose convex surface faces the image side. The fourth lens L4 is in a meniscus shape whose convex surface faces the image side, and the image side surface of the fourth lens is in an aspheric surface on which the positive refractive power is reduced as one goes from the optical axis toward the periphery. The fifth lens L5 includes an aspheric surface facing the image side, and the surface includes an inflection point located on an area excluding the intersection point of the optical axis and the image side surface of the fifth lens. As for the parallel flat plate F, an optical low-pass filter, IR cut filter or sealed glass such as a solid image pickup element is assumed.

FIGS. 16a through 16d are diagrams of aberrations (spherical aberration, astigmatism, distortion and meridional coma, respectively) of the image pickup lens shown in Example 6.

The present Example employs a plastic material for all lenses, and is designed to move the first through fifth lenses as one body as the operation that all the lenses in the image pickup lens are moved to be drawn out for the auto-focusing operation and the switching operation to/from the macro photograph mode.

Example 7

Lens data of an image pickup lens in Example 7 is shown in the following Table 7.

TABLE 7

Example 7
f = 4.96 mm fB = 0.52 mm F = 2.88 2Y = 7.056 mm
ENTP = 0.79 mm EXTP = −2.66 mm H1 = −1.99 mm H2 = −4.44 mm

| Surface No. | R (mm) | D (mm) | Nd | νd | Effective radius (mm) |
|---|---|---|---|---|---|
| 1* | 1.571 | 0.87 | 1.54470 | 56.2 | 1.11 |
| 2* | 15.189 | 0.06 | | | 0.73 |
| 3 (Stop) | ∞ | 0.05 | | | 0.69 |
| 4* | 7.824 | 0.10 | 1.63200 | 23.4 | 0.71 |
| 5* | 1.950 | 0.31 | | | 0.77 |
| 6* | 40.312 | 0.41 | 1.63200 | 23.4 | 1.08 |
| 7* | −17.171 | 0.76 | | | 1.27 |
| 8* | −5.611 | 1.02 | 1.54470 | 56.2 | 1.95 |
| 9* | −1.402 | 0.58 | | | 2.21 |
| 10* | −2.423 | 0.45 | 1.54470 | 56.2 | 2.88 |
| 11* | 3.471 | 0.44 | | | 3.18 |
| 12 | ∞ | 0.15 | 1.51630 | 64.1 | 3.50 |
| 13 | ∞ | | | | 3.53 |

TABLE 7-continued

Example 7
f = 4.96 mm fB = 0.52 mm F = 2.88 2Y = 7.056 mm
ENTP = 0.79 mm EXTP = −2.66 mm H1 = −1.99 mm H2 = −4.44 mm Aspheric surface coefficient 1st surface

| | |
|---|---|
| K = | 0.83130E+00 |
| A4 = | −0.10268E−01 |
| A6 = | −0.42689E−02 |
| A8 = | −0.43147E−02 |
| A10 = | 0.42401E−02 |
| A12 = | −0.24172E−02 |
| A14 = | −0.75305E−03 |

2nd surface

| | |
|---|---|
| K = | 0.68651E+02 |
| A4 = | 0.89811E−01 |
| A6 = | −0.29703E−01 |
| A8 = | 0.61974E−01 |
| A10 = | −0.11922E−01 |
| A12 = | 0.25853E−01 |
| A14 = | 0.17162E−01 |

4th surface

| | |
|---|---|
| K = | −0.70000E+02 |
| A4 = | −0.56006E−01 |
| A6 = | 0.10710E+00 |
| A8 = | −0.17971E+00 |
| A10 = | 0.87586E−01 |
| A12 = | −0.23393E−02 |
| A14 = | 0.97877E−04 |

5th surface

| | |
|---|---|
| K = | −0.88402E+01 |
| A4 = | 0.39474E−01 |
| A6 = | 0.72314E−01 |
| A8 = | −0.12762E+00 |
| A10 = | 0.91917E−01 |
| A12 = | −0.27951E−01 |
| A14 = | 0.26160E−03 |

6th surface

| | |
|---|---|
| K = | 0.70000E+02 |
| A4 = | −0.52533E−02 |
| A6 = | −0.39345E−02 |
| A8 = | 0.22647E−01 |
| A10 = | −0.99634E−02 |
| A12 = | 0.67941E−02 |
| A14 = | −0.57345E−02 |

7th surface

| | |
|---|---|
| K = | −0.70000E+02 |
| A4 = | −0.76440E−03 |
| A6 = | 0.84281E−02 |
| A8 = | −0.18005E−01 |
| A10 = | 0.16989E−01 |
| A12 = | −0.48745E−02 |
| A14 = | −0.25855E−03 |

8th surface

| | |
|---|---|
| K = | 0.32625E+01 |
| A4 = | −0.16212E−01 |
| A6 = | 0.11989E−01 |
| A8 = | −0.22181E−02 |
| A10 = | −0.62548E−03 |
| A12 = | 0.46498E−03 |
| A14 = | −0.71685E−04 |

9th surface

| | |
|---|---|
| K = | −0.28792E+01 |
| A4 = | −0.42948E−01 |
| A6 = | 0.10855E−01 |
| A8 = | −0.71437E−03 |
| A10 = | 0.43950E−03 |
| A12 = | −0.75454E−04 |
| A14 = | −0.10303E−05 |

10th surface

| | |
|---|---|
| K = | −0.75911E+01 |
| A4 = | −0.43692E−01 |
| A6 = | 0.11221E−01 |
| A8 = | −0.30259E−03 |
| A10 = | −0.17435E−03 |
| A12 = | 0.22224E−04 |
| A14 = | −0.85489E−06 |

11th surface

| | |
|---|---|
| K = | −0.22430E+02 |
| A4 = | −0.25878E−01 |
| A6 = | 0.40604E−02 |
| A8 = | −0.64925E−03 |
| A10 = | 0.71685E−04 |
| A12 = | −0.41703E−05 |
| A14 = | 0.96628E−07 |

Single lens data

| Lens | Starting surface | Focal length (mm) |
|---|---|---|
| 1 | 1 | 3.146 |
| 2 | 4 | −4.136 |
| 3 | 6 | 19.107 |
| 4 | 8 | 3.162 |
| 5 | 10 | −2.551 |

Figure 17:
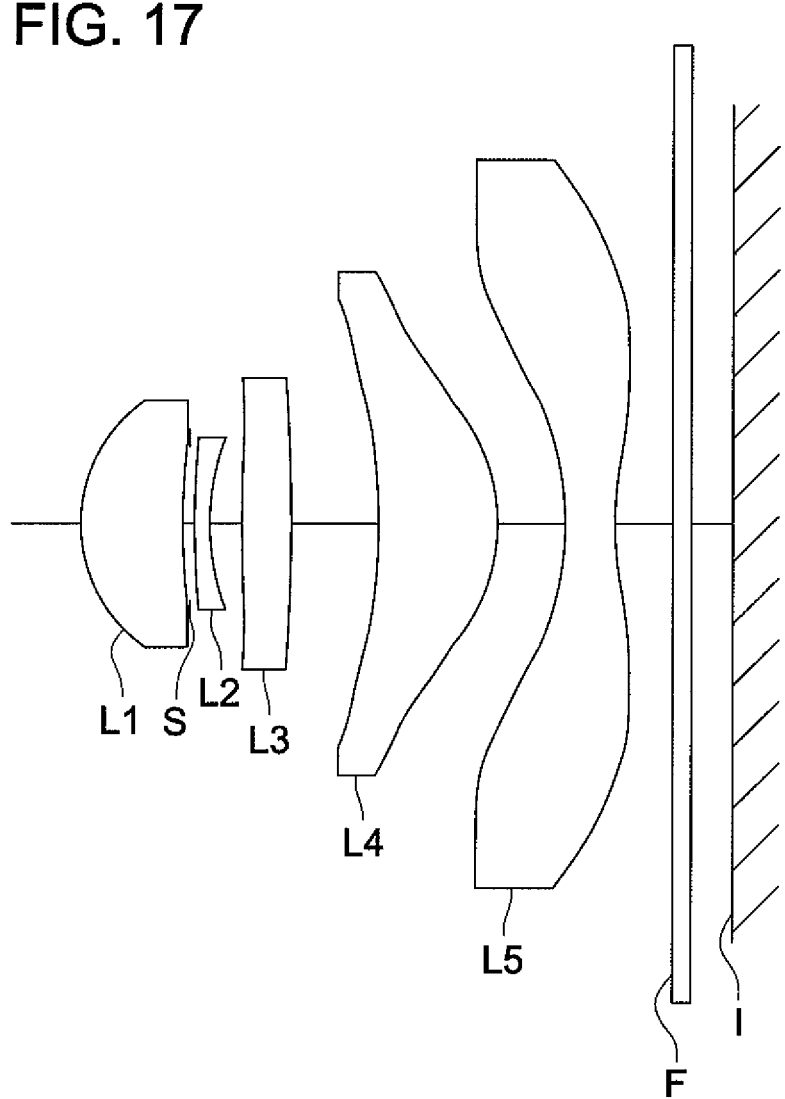
FIG. 17 is a sectional view in the direction of the optical axis of the image pickup lens in Example 7.

FIG. 17 is a cross sectional view of the lens in Example 7. FIG. 17 shows first lens L1, second lens L2, third lens L3, fourth lens L4, fifth lens L5, aperture stop S, imaging surface I, and parallel flat plate F. The second lens L2 includes an image side surface in an aspheric shape on which the negative refractive power is reduced as one goes from the optical axis toward the periphery. The third lens L3 has a positive refractive power and is in a biconcave shape. The fourth lens L4 is in a meniscus shape whose convex surface faces the image side, and the image side surface of the fourth lens is in an aspheric surface on which the positive refractive power is reduced as one goes from the optical axis toward the periphery. The fifth lens L5 includes an aspheric surface facing the image side, and the surface includes an inflection point located on an area excluding the intersection point of the optical axis and the image side surface of the fifth lens. As for the parallel flat plate F, an optical low-pass filter, IR cut filter or sealed glass such as a solid image pickup element is assumed.

FIGS. 18a through 18d are diagrams of aberrations (spherical aberration, astigmatism, distortion and meridional coma, respectively) of the image pickup lens shown in Example 7.

The present Example employs a plastic material for all lenses, and is designed to move the first through third lenses as one body as the operation that the lenses in the image pickup lens are partially moved to be drawn out for the auto-focusing operation and the switching operation to/from the macro photograph mode.

Example 8

Lens data of an image pickup lens in Example 8 is shown in the following Table 8.

TABLE 8

Example 8
f = 4.95 mm fB = 0.74 mm F = 2.89 2Y = 7.056 mm
ENTP = 0.67 mm EXTP = −2.03 mm H1 = −3.22 mm H2 = −4.21 mm

| Surface No. | R (mm) | D (mm) | Nd | νd | Effective radius (mm) |
|---|---|---|---|---|---|
| 1* | 1.666 | 0.82 | 1.54470 | 56.2 | 1.13 |
| 2* | −18.998 | 0.02 | | | 0.85 |
| 3 (Stop) | ∞ | 0.07 | | | 0.74 |
| 4* | 30.109 | 0.27 | 1.63200 | 23.4 | 0.75 |
| 5* | 2.917 | 0.53 | | | 0.82 |
| 6* | −4.011 | 0.48 | 1.63200 | 23.4 | 1.05 |
| 7* | −3.572 | 0.45 | | | 1.33 |
| 8* | −4.535 | 0.82 | 1.54470 | 56.2 | 1.73 |
| 9* | −1.823 | 0.74 | | | 2.10 |
| 10* | −1.697 | 0.45 | 1.62970 | 50.3 | 2.70 |
| 11* | 519.551 | 0.33 | | | 2.94 |

Aspheric surface coefficient

1st surface

| | |
|---|---|
| K = | −0.90835E−02 |
| A4 = | −0.53029E−02 |
| A6 = | 0.61939E−03 |
| A8 = | −0.88472E−02 |
| A10 = | 0.44408E−03 |
| A12 = | 0.18605E−02 |
| A14 = | −0.31735E−02 |

2nd surface

| | |
|---|---|
| K = | −0.50000E+02 |
| A4 = | 0.64507E−02 |
| A6 = | −0.95468E−02 |
| A8 = | 0.60733E−02 |
| A10 = | −0.57496E−02 |
| A12 = | −0.29120E−01 |
| A14 = | 0.23702E−01 |

4th surface

| | |
|---|---|
| K = | 0.23045E+02 |
| A4 = | 0.29759E−01 |
| A6 = | 0.30766E−01 |
| A8 = | −0.39498E−01 |
| A10 = | 0.68657E−01 |
| A12 = | −0.56360E−01 |
| A14 = | −0.50575E−03 |

5th surface

| | |
|---|---|
| K = | 0.56138E+00 |
| A4 = | 0.37403E−01 |
| A6 = | 0.53414E−01 |
| A8 = | −0.40337E−01 |
| A10 = | 0.93197E−01 |
| A12 = | −0.43382E−01 |
| A14 = | −0.26385E−03 |

6th surface

| | |
|---|---|
| K = | 0.60547E+01 |
| A4 = | −0.48941E−01 |
| A6 = | −0.23104E−01 |
| A8 = | 0.51432E−01 |
| A10 = | −0.73129E−02 |
| A12 = | −0.46935E−01 |
| A14 = | 0.38891E−01 |

7th surface

| | |
|---|---|
| K = | 0.20329E+01 |
| A4 = | −0.22104E−01 |
| A6 = | −0.28834E−03 |
| A8 = | 0.67031E−02 |
| A10 = | 0.14227E−02 |
| A12 = | 0.19302E−03 |
| A14 = | −0.36898E−03 |

8th surface

| | |
|---|---|
| K = | −0.16798E+01 |
| A4 = | −0.18481E−01 |
| A6 = | 0.12303E−01 |
| A8 = | −0.40321E−02 |
| A10 = | 0.17316E−03 |
| A12 = | 0.25859E−03 |
| A14 = | −0.61955E−04 |

9th surface

| | |
|---|---|
| K = | −0.27038E+01 |
| A4 = | −0.23692E−01 |
| A6 = | 0.12174E−01 |
| A8 = | −0.11857E−02 |
| A10 = | 0.51281E−04 |
| A12 = | −0.26199E−04 |
| A14 = | 0.91959E−06 |

10th surface

| | |
|---|---|
| K = | −0.25193E+01 |
| A4 = | −0.19368E−01 |
| A6 = | 0.74144E−02 |
| A8 = | −0.29854E−03 |
| A10 = | −0.95134E−04 |
| A12 = | 0.11269E−04 |
| A14 = | −0.34300E−06 |

11th surface

| | |
|---|---|
| K = | 0.29367E+05 |
| A4 = | −0.26235E−01 |
| A6 = | 0.36566E−02 |
| A8 = | −0.45778E−03 |
| A10 = | 0.32109E−04 |
| A12 = | −0.22944E−05 |
| A14 = | 0.15566E−06 |

Single lens data

| Lens | Starting surface | Focal length (mm) |
|---|---|---|
| 1 | 1 | 2.853 |
| 2 | 4 | −5.131 |
| 3 | 6 | 36.226 |
| 4 | 8 | 5.058 |
| 5 | 10 | −2.686 |

Figure 19:
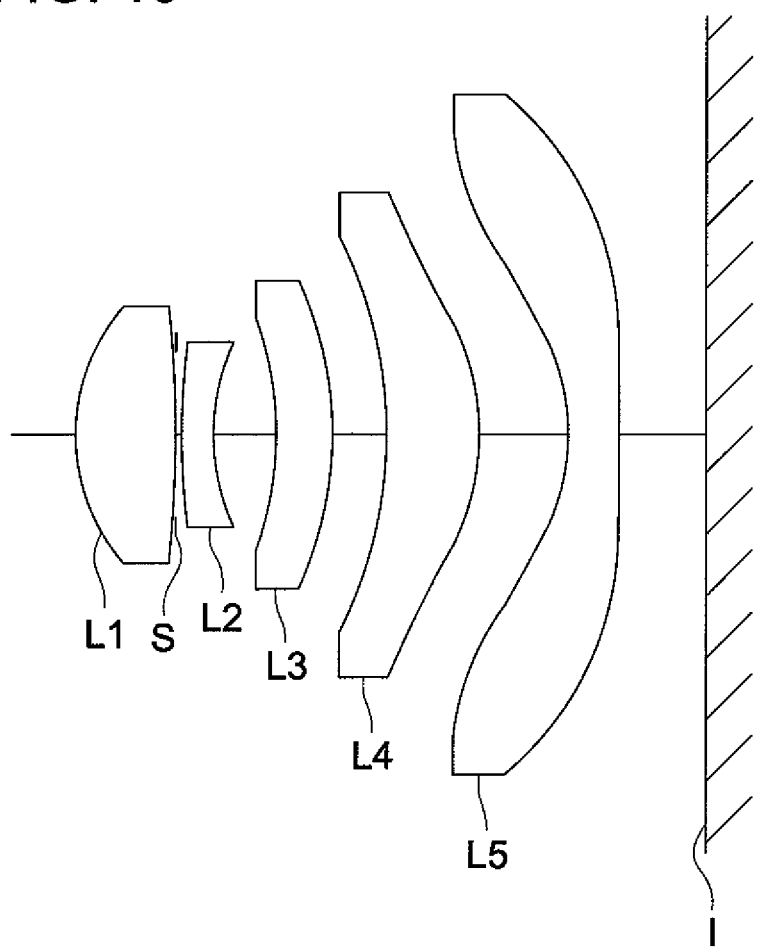
FIG. 19 is a sectional view in the direction of the optical axis of the image pickup lens in Example 8.

FIG. 19 is a cross sectional view of the lens in Example 8. FIG. 19 shows first lens L1, second lens L2, third lens L3, fourth lens L4, fifth lens L5, aperture stop S, imaging surface I, and parallel flat plate F. The second lens L2 includes an image side surface in an aspheric shape on which the negative refractive power is reduced as one goes from the optical axis toward the periphery. The third lens L3 has a positive refractive power and is in a meniscus shape whose convex surface faces the image side. The fourth lens L4 is in a meniscus shape whose convex surface faces the image side, and the image side surface of the fourth lens is in an aspheric surface on which the positive refractive power is reduced as one goes from the optical axis toward the periphery. The fifth lens L5 includes an aspheric surface facing the image side, and the surface includes an inflection point located on an area excluding the intersection point of the optical axis and the image side surface of the fifth lens. As for the parallel flat plate F, an optical low-pass filter, IR cut filter or sealed glass such as a solid image pickup element is assumed.

FIGS. 20a through 20d are diagrams of aberrations (spherical aberration, astigmatism, distortion and meridional coma, respectively) of the image pickup lens shown in Example 8.

The present Example employs a glass mold lens for the fifth lens and employs a plastic material for the first through fourth lenses, and is designed to move the first through third lenses as one body as the operation that the lenses in the image pickup lens are partially moved to be drawn out for the auto-focusing operation and the switching operation to/from the macro photograph mode.

Example 9

Lens data of an image pickup lens in Example 9 is shown in the following Table 9.

TABLE 9

Example 9
f = 5.14 mm fB = 0.38 mm F = 2.88 2Y = 7.056 mm
ENTP = 0.75 mm EXTP = −2.82 mm H1 = −2.36 mm H2 = −4.76 mm

| Surface No. | R (mm) | D (mm) | Nd | vd | Effective radius (mm) |
|---|---|---|---|---|---|
| 1* | 1.741 | 0.91 | 1.54470 | 56.2 | 1.19 |
| 2* | −15.045 | 0.02 | | | 0.87 |
| 3 (Stop) | ∞ | 0.07 | | | 0.75 |
| 4* | 47.638 | 0.30 | 1.63200 | 23.4 | 0.77 |
| 5* | 2.776 | 0.51 | | | 0.85 |
| 6* | −7.760 | 0.49 | 1.63200 | 23.4 | 1.11 |
| 7* | −5.471 | 0.52 | | | 1.38 |
| 8* | −3.544 | 0.87 | 1.54470 | 56.2 | 1.64 |
| 9* | −1.465 | 0.44 | | | 1.99 |
| 10* | −2.939 | 0.45 | 1.54470 | 56.2 | 2.78 |
| 11* | 3.241 | 0.60 | | | 3.02 |
| 12 | ∞ | 0.15 | 1.51630 | 64.1 | 3.67 |
| 13 | ∞ | | | | 3.72 |

Aspheric surface coefficient

1st surface

K = 0.56578E−01
A4 = −0.38384E−02
A6 = −0.24813E−02
A8 = −0.26675E−02
A10 = 0.56963E−04
A12 = 0.45840E−03
A14 = −0.96060E−03

2nd surface

K = −0.30000E+02
A4 = 0.83920E−02
A6 = 0.34618E−02
A8 = 0.19778E−03
A10 = −0.61346E−02
A12 = −0.86245E−02
A14 = 0.68234E−02

4th surface

K = −0.30010E+02
A4 = 0.92225E−02
A6 = 0.45646E−01
A8 = −0.28388E−01
A10 = 0.92717E−02
A12 = −0.28557E−02
A14 = −0.12337E−02

5th surface

K = −0.18989E+01
A4 = 0.24160E−01
A6 = 0.62322E−01
A8 = −0.42455E−01
A10 = 0.52383E−01
A12 = −0.13455E−01
A14 = −0.64360E−03

6th surface

K = 0.10151E+02
A4 = −0.46549E−01
A6 = −0.21802E−01
A8 = 0.38611E−01
A10 = −0.92703E−02
A12 = −0.31188E−01
A14 = 0.22473E−01

TABLE 9-continued

Example 9
f = 5.14 mm fB = 0.38 mm F = 2.88 2Y = 7.056 mm
ENTP = 0.75 mm EXTP = −2.82 mm H1 = −2.36 mm H2 = −4.76 mm 7th surface K = 0.32195E+01
A4 = −0.28557E−01
A6 = 0.58197E−02
A8 = 0.13286E−02
A10 = −0.61585E−03
A12 = 0.30164E−03
A14 = −0.46265E−04

8th surface

K = 0.11099E+01
A4 = −0.31386E−01
A6 = 0.14448E−01
A8 = −0.34807E−02
A10 = −0.33301E−03
A12 = 0.25191E−03
A14 = −0.29777E−05

9th surface

K = −0.28409E+01
A4 = −0.39030E−01
A6 = 0.11960E−01
A8 = −0.17698E−02
A10 = 0.29007E−03
A12 = −0.29318E−04
A14 = 0.11551E−05

10th surface

K = −0.16643E+01
A4 = −0.28402E−01
A6 = 0.10087E−01
A8 = −0.45069E−03
A10 = −0.16285E−03
A12 = 0.25189E−04
A14 = −0.11050E−05

11th surface

K = −0.23016E+02
A4 = −0.34067E−01
A6 = 0.51715E−02
A8 = −0.67018E−03
A10 = 0.60510E−04
A12 = −0.49001E−05
A14 = 0.24886E−06

Single lens data

| Lens | Starting surface | Focal length (mm) |
|---|---|---|
| 1 | 1 | 2.920 |
| 2 | 4 | −4.677 |
| 3 | 6 | 27.087 |
| 4 | 8 | 3.996 |
| 5 | 10 | −2.759 |

Figure 21:
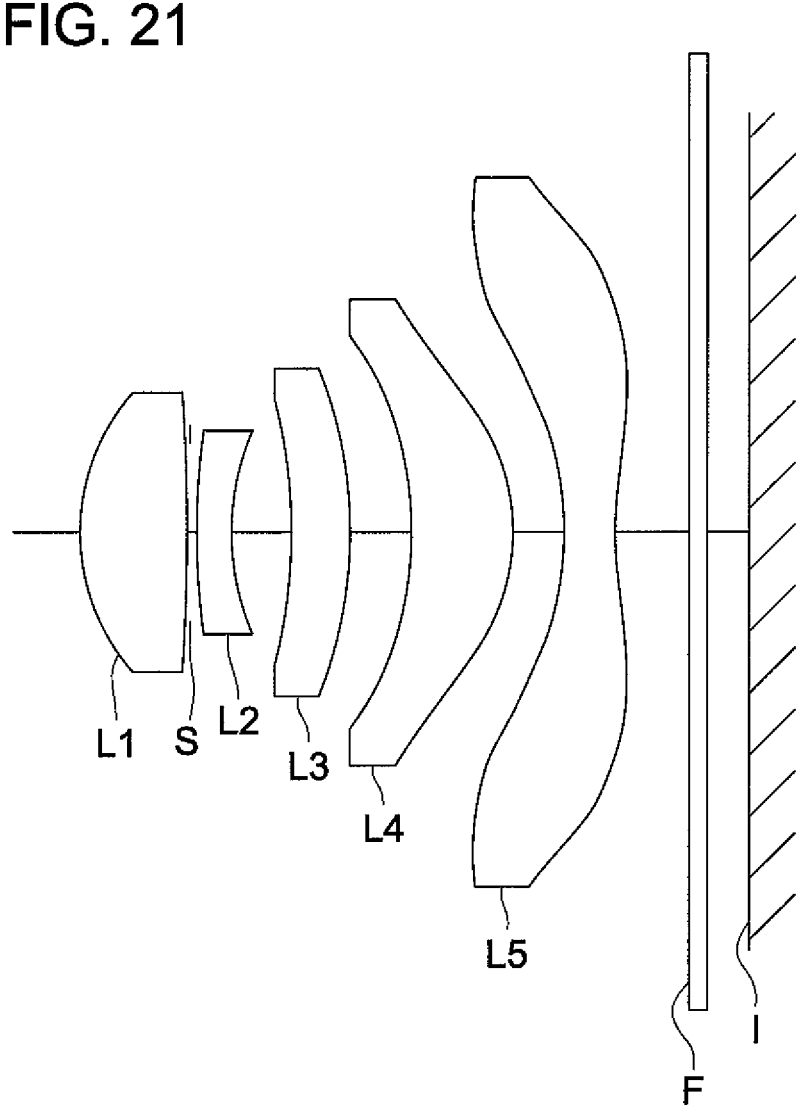
FIG. 21 is a sectional view in the direction of the optical axis of the image pickup lens in Example 9.
Figure 22A:
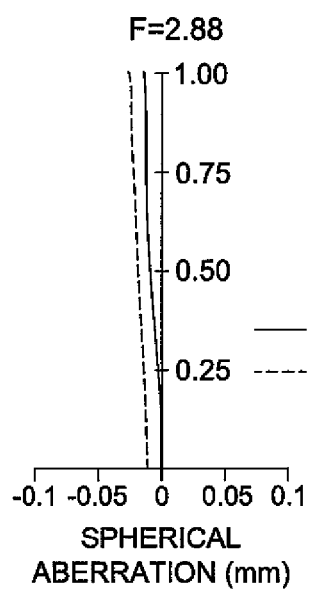
FIGS. 22a through 22d show aberration diagrams in Example 9 including spherical aberration, astigmatism, distortion, and meridional coma, respectively.
Figure 22B:
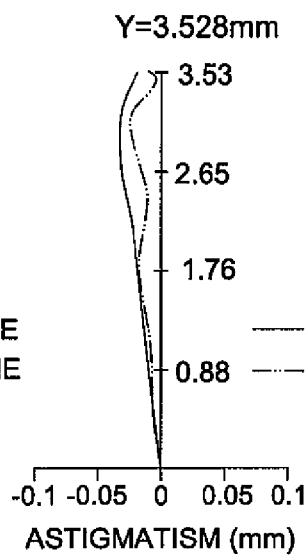
Figure 22C:
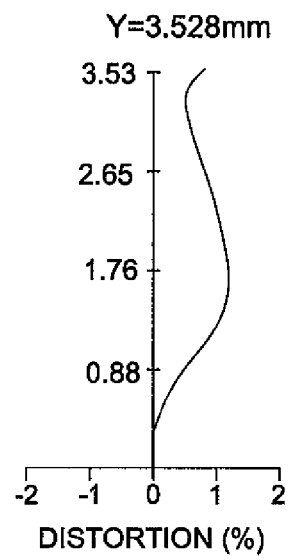
Figure 22D:
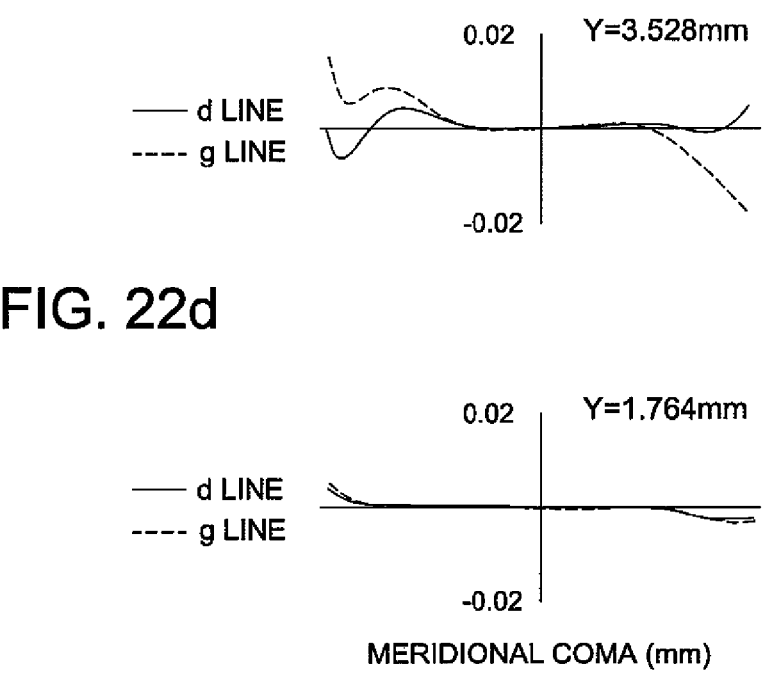

FIG. 21 is a cross sectional view of the lens in Example 9. FIG. 21 shows first lens L1, second lens L2, third lens L3, fourth lens L4, fifth lens L5, aperture stop S, imaging surface I, and parallel flat plate F. The second lens L2 includes an image side surface in an aspheric shape on which the negative refractive power is reduced as one goes from the optical axis toward the periphery. The third lens L3 has a positive refractive power and is in a meniscus shape whose convex surface faces the image side. The fourth lens L4 is in a meniscus shape whose convex surface faces the image side, and the image side surface of the fourth lens is in an aspheric surface on which the positive refractive power is reduced as one goes from the optical axis toward the periphery. The fifth lens L5 includes an aspheric surface facing the image side, and the surface includes an inflection point located on an area excluding the intersection point of the optical axis and the image side surface of the fifth lens. As for the parallel flat plate F, an optical low-pass filter, IR cut filter or sealed glass such as a solid image pickup element is assumed.

FIGS. 22a through 22d are diagrams of aberrations (spherical aberration, astigmatism, distortion and meridional coma, respectively) of the image pickup lens shown in Example 9.

The present Example employs a plastic material for all lenses, and is designed to move the first through third lenses as one body as the operation that the lenses in the image pickup lens are partially moved to be drawn out for the auto-focusing operation and the switching operation to/from the macro photograph mode.

Example 10

Lens data of an image pickup lens in Example 10 is shown in the following Table 10.

TABLE 10

Example 10
f = 5.03 mm fB = 0.36 mm F = 2.88 2Y = 7.056 mm
ENTP = 0.72 mm EXTP = −2.83 mm H1 = −2.18 mm H2 = −4.66 mm

| Surface No. | R (mm) | D (mm) | Nd | νd | Effective radius (mm) |
|---|---|---|---|---|---|
| 1* | 1.726 | 0.87 | 1.54470 | 56.2 | 1.14 |
| 2* | −33.292 | 0.02 | | | 0.83 |
| 3 (Stop) | ∞ | 0.07 | | | 0.75 |
| 4* | 15.952 | 0.30 | 1.63200 | 23.4 | 0.76 |
| 5* | 2.972 | 0.60 | | | 0.83 |
| 6* | −6.447 | 0.63 | 1.63200 | 23.4 | 1.14 |
| 7* | −10.575 | 0.31 | | | 1.54 |
| 8* | −6.234 | 0.89 | 1.54470 | 56.2 | 1.74 |
| 9* | −1.435 | 0.46 | | | 2.04 |
| 10* | −2.437 | 0.45 | 1.54470 | 56.2 | 2.70 |
| 11* | 3.596 | 0.60 | | | 2.98 |
| 12 | ∞ | 0.15 | 1.51630 | 64.1 | 3.48 |
| 13 | ∞ | | | | 3.52 |

Aspheric surface coefficient

1st surface

| K = | 0.30018E−02 |
| A4 = | −0.55313E−02 |
| A6 = | −0.49927E−02 |
| A8 = | −0.37862E−02 |
| A10 = | −0.60143E−03 |
| A12 = | −0.13767E−03 |
| A14 = | −0.14838E−02 |

2nd surface

| K = | 0.30000E+02 |
| A4 = | −0.88598E−02 |
| A6 = | −0.91733E−03 |
| A8 = | 0.11877E−03 |
| A10 = | −0.58309E−02 |
| A12 = | −0.96625E−02 |
| A14 = | 0.39638E−02 |

4th surface

| K = | 0.30000E+02 |
| A4 = | 0.18495E−01 |
| A6 = | 0.42836E−01 |
| A8 = | −0.28907E−01 |
| A10 = | 0.17676E−01 |
| A12 = | −0.12513E−01 |
| A14 = | −0.12337E−02 |

5th surface

| K = | 0.74019E+00 |
| A4 = | 0.38736E−01 |
| A6 = | 0.55567E−01 |

TABLE 10-continued

Example 10
f = 5.03 mm fB = 0.36 mm F = 2.88 2Y = 7.056 mm
ENTP = 0.72 mm EXTP = −2.83 mm H1 = −2.18 mm H2 = −4.66 mm

| A8 = | −0.36194E−01 |
| A10 = | 0.66288E−01 |
| A12 = | −0.27165E−01 |
| A14 = | −0.64352E−03 |

6th surface

| K = | 0.20165E+02 |
| A4 = | −0.59452E−01 |
| A6 = | −0.23276E−01 |
| A8 = | 0.40113E−01 |
| A10 = | −0.15272E−01 |
| A12 = | −0.37999E−01 |
| A14 = | 0.28556E−01 |

7th surface

| K = | 0.24334E+02 |
| A4 = | −0.43441E−01 |
| A6 = | 0.38446E−02 |
| A8 = | −0.39522E−03 |
| A10 = | −0.11851E−02 |
| A12 = | 0.35987E−03 |
| A14 = | −0.33067E−04 |

8th surface

| K = | 0.38433E+00 |
| A4 = | −0.31751E−01 |
| A6 = | 0.12224E−01 |
| A8 = | −0.38062E−02 |
| A10 = | −0.16809E−03 |
| A12 = | 0.26895E−03 |
| A14 = | −0.34307E−04 |

9th surface

| K = | −0.27704E+01 |
| A4 = | −0.36348E−01 |
| A6 = | 0.13019E−01 |
| A8 = | −0.16164E−02 |
| A10 = | 0.29304E−03 |
| A12 = | −0.32883E−04 |
| A14 = | −0.73728E−06 |

10th surface

| K = | −0.21486E+01 |
| A4 = | −0.27001E−01 |
| A6 = | 0.10190E−01 |
| A8 = | −0.46109E−03 |
| A10 = | −0.16511E−03 |
| A12 = | 0.25001E−04 |
| A14 = | −0.10723E−05 |

11th surface

| K = | −0.24814E+02 |
| A4 = | −0.33800E−01 |
| A6 = | 0.52151E−02 |
| A8 = | −0.65956E−03 |
| A10 = | 0.60601E−04 |
| A12 = | −0.49905E−05 |
| A14 = | 0.24318E−06 |

Single lens data

| Lens | Starting surface | Focal length (mm) |
|---|---|---|
| 1 | 1 | 3.040 |
| 2 | 4 | −5.833 |
| 3 | 6 | −27.765 |
| 4 | 8 | 3.212 |
| 5 | 10 | −2.598 |

Figure 23:
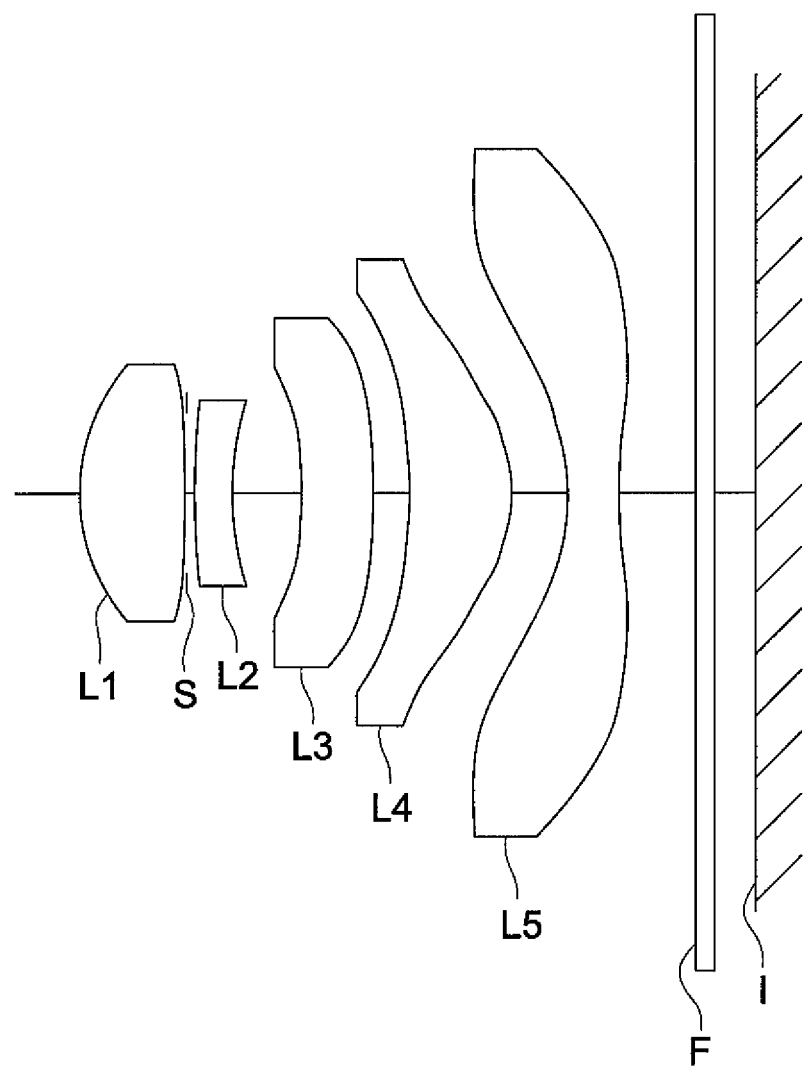
FIG. 23 is a sectional view in the direction of the optical axis of the image pickup lens in Example 10.

FIG. 23 is a cross sectional view of the lens in Example 10. FIG. 23 shows first lens L1, second lens L2, third lens L3, fourth lens L4, fifth lens L5, aperture stop S, imaging surface I, and parallel flat plate F. The second lens L2 includes an image side surface in an aspheric shape on which the negative refractive power is reduced as one goes from the optical axis toward the periphery. The third lens L3 has a negative refractive power and is in a meniscus shape whose convex surface faces the image side. The fourth lens L4 is in a meniscus shape whose convex surface faces the image side, and the image side surface of the fourth lens is in an aspheric surface on which the positive refractive power is reduced as one goes from the optical axis toward the periphery. The fifth lens L5 includes an aspheric surface facing the image side, and the surface includes an inflection point located on an area excluding the intersection point of the optical axis and the image side surface of the fifth lens. As for the parallel flat plate F, an optical low-pass filter, IR cut filter or sealed glass such as a solid image pickup element is assumed.

FIGS. 24a through 24d are diagrams of aberrations (spherical aberration, astigmatism, distortion and meridional coma, respectively) of the image pickup lens shown in Example 10.

The present Example employs a plastic material for all lenses, and is designed to move the first through third lenses as one body as the operation that the lenses in the image pickup lens are partially moved to be drawn out for the auto-focusing operation and the switching operation to/from the macro photograph mode.

Example 11

Lens data of an image pickup lens in Example 11 is shown in the following Table 11.

TABLE 11

Example 11
f = 4.66 mm fB = 0.38 mm F = 2.88 2Y = 7.016 mm
ENTP = 0.54 mm EXTP = −2.86 mm H1 = −1.49 mm H2 = −4.28 mm

| Surface No. | R (mm) | D (mm) | Nd | vd | Effective radius (mm) |
|---|---|---|---|---|---|
| 1* | 2.163 | 0.70 | 1.54470 | 56.2 | 1.08 |
| 2* | −12.492 | 0.02 | | | 0.81 |
| 3 (Stop) | ∞ | 0.07 | | | 0.73 |
| 4* | 4.601 | 0.30 | 1.63200 | 23.4 | 0.76 |
| 5* | 1.825 | 0.43 | | | 0.86 |
| 6* | −12.506 | 0.72 | 1.54470 | 56.2 | 1.15 |
| 7* | −2.735 | 0.67 | | | 1.32 |
| 8* | −1.668 | 0.66 | 1.54470 | 56.2 | 1.51 |
| 9* | −1.090 | 0.56 | | | 1.81 |
| 10* | −3.894 | 0.45 | 1.54470 | 56.2 | 2.55 |
| 11* | 2.247 | 0.60 | | | 2.97 |
| 12 | ∞ | 0.15 | 1.51630 | 64.1 | 3.52 |
| 13 | ∞ | | | | 3.56 |

Aspheric surface coefficient

1st surface

K = 0.14354E+00
A4 = −0.14937E−02
A6 = −0.51668E−03
A8 = −0.30690E−02
A10 = 0.19585E−02
A12 = 0.23605E−02
A14 = −0.36969E−02

2nd surface

K = −0.27713E+01
A4 = 0.23422E−01
A6 = −0.66611E−02
A8 = −0.12764E−02
A10 = −0.22454E−02
A12 = −0.17472E−01
A14 = 0.30397E−02

TABLE 11-continued

Example 11
f = 4.66 mm fB = 0.38 mm F = 2.88 2Y = 7.016 mm
ENTP = 0.54 mm EXTP = −2.86 mm H1 = −1.49 mm H2 = −4.28 mm 4th surface K = −0.33010E+01
A4 = −0.52646E−01
A6 = 0.61218E−01
A8 = −0.36958E−01
A10 = −0.28962E−01
A12 = −0.19938E−01
A14 = 0.37629E−01

5th surface

K = −0.55216E+01
A4 = 0.24960E−01
A6 = 0.37355E−01
A8 = −0.11583E−01
A10 = −0.21095E−01
A12 = −0.59217E−02
A14 = 0.18585E−01

6th surface

K = −0.30000E+02
A4 = −0.30159E−01
A6 = 0.14241E−02
A8 = 0.21189E−01
A10 = 0.46808E−02
A12 = 0.23785E−02
A14 = −0.31313E−02

7th surface

K = 0.11492E+01
A4 = −0.15511E−01
A6 = 0.14712E−02
A8 = 0.34090E−03
A10 = 0.18102E−02
A12 = 0.35730E−03
A14 = 0.74345E−03

8th surface

K = −0.25289E−01
A4 = −0.20414E−01
A6 = 0.21106E−01
A8 = 0.30398E−02
A10 = −0.20563E−02
A12 = 0.33434E−03
A14 = 0.14615E−03

9th surface

K = −0.25566E+01
A4 = −0.76664E−01
A6 = 0.26939E−01
A8 = −0.17333E−02
A10 = 0.94557E−04
A12 = −0.36312E−04
A14 = −0.32167E−05

10th surface

K = −0.30000E+02
A4 = −0.40555E−01
A6 = 0.69364E−02
A8 = −0.85151E−04
A10 = −0.12705E−03
A12 = 0.22480E−04
A14 = −0.13347E−05

11th surface

K = −0.12319E+02
A4 = −0.31415E−01
A6 = 0.45904E−02
A8 = −0.72751E−03
A10 = 0.82796E−04
A12 = −0.61047E−05
A14 = 0.21809E−06

TABLE 11-continued

Example 11
f = 4.66 mm fB = 0.38 mm F = 2.88 2Y = 7.016 mm
ENTP = 0.54 mm EXTP = −2.86 mm H1 = −1.49 mm H2 = −4.28 mm Single lens data

| Lens | Starting surface | Focal length (mm) |
|---|---|---|
| 1 | 1 | 3.443 |
| 2 | 4 | −4.994 |
| 3 | 6 | 6.262 |
| 4 | 8 | 4.120 |
| 5 | 10 | −2.550 |

Figure 25:
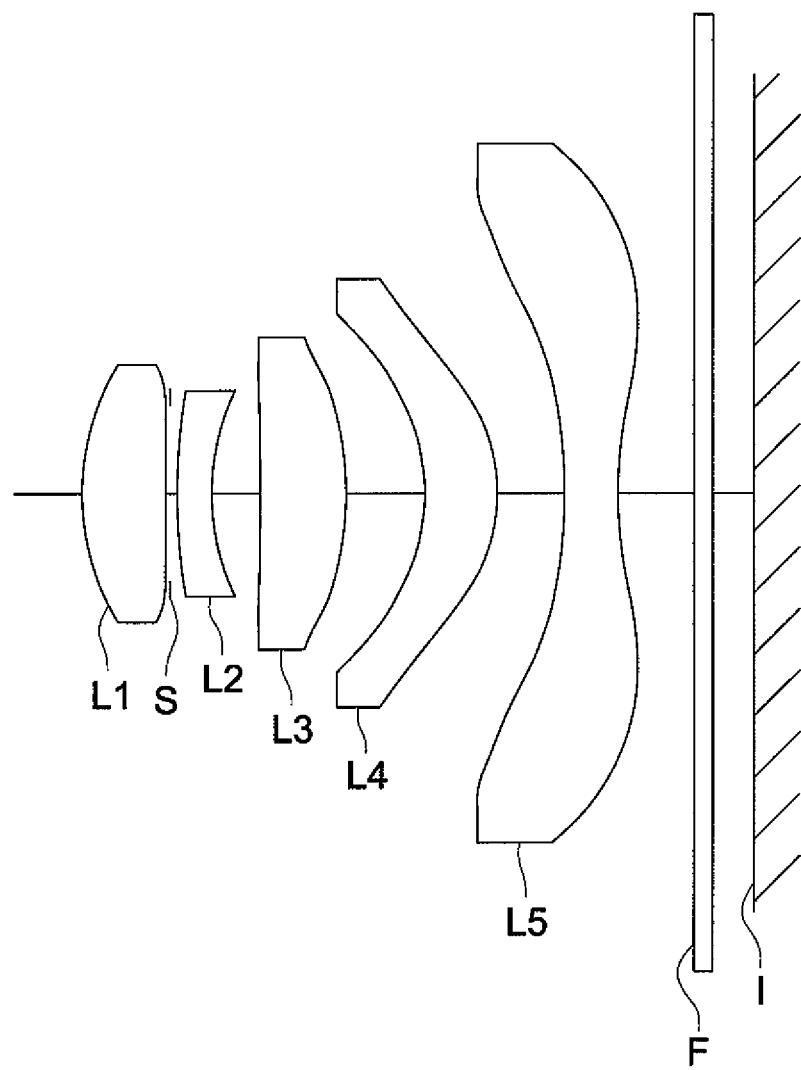
FIG. 25 is a sectional view in the direction of the optical axis of the image pickup lens in Example 11.
Figure 26A:
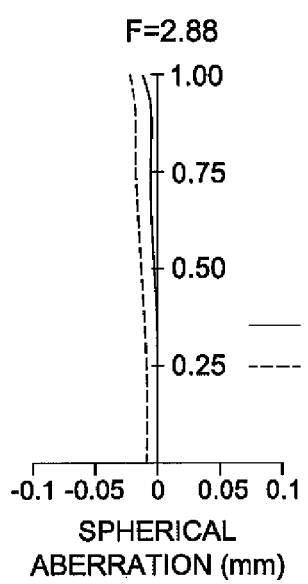
FIGS. 26a through 26d show aberration diagrams in Example 11 including spherical aberration, astigmatism, distortion, and meridional coma, respectively.
Figure 26B:
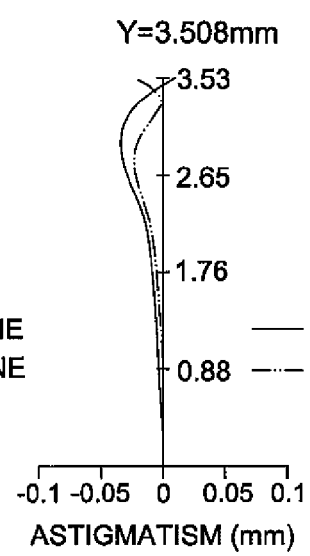
Figure 26C:
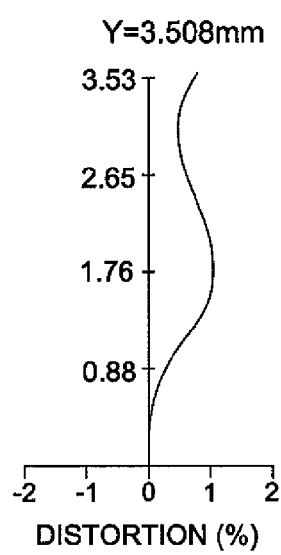
Figure 26D:
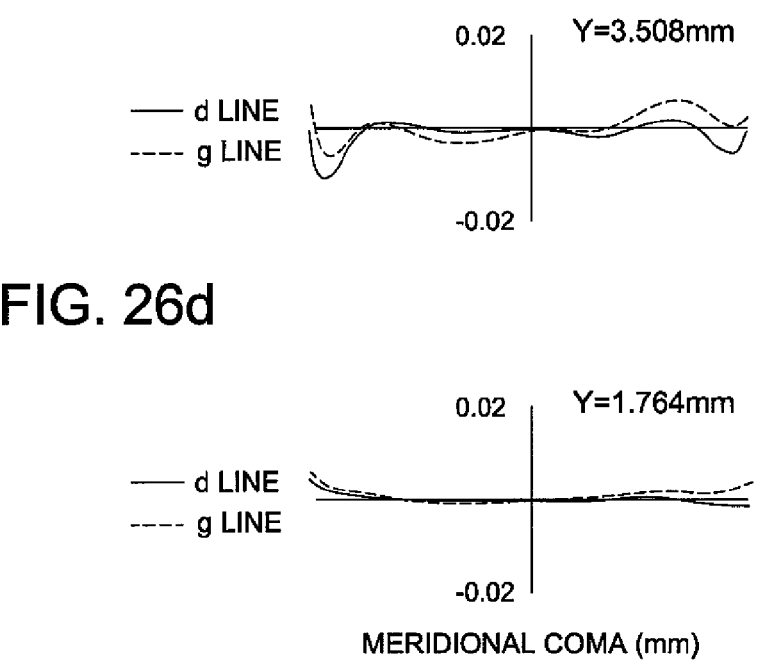

FIG. 25 is a cross sectional view of the lens in Example 11. FIG. 25 shows first lens L1, second lens L2, third lens L3, fourth lens L4, fifth lens L5, aperture stop S, imaging surface I, and parallel flat plate F. The second lens L2 includes an image side surface in an aspheric shape on which the negative refractive power is reduced as one goes from the optical axis toward the periphery. The third lens L3 has a positive refractive power and is in a meniscus shape whose convex surface faces the image side. The fourth lens L4 is in a meniscus shape whose convex surface faces the image side, and the image side surface of the fourth lens is in an aspheric surface on which the positive refractive power is reduced as one goes from the optical axis toward the periphery. The fifth lens L5 includes an aspheric surface facing the image side, and the surface includes an inflection point located on an area excluding the intersection point of the optical axis and the image side surface of the fifth lens. As for the parallel flat plate F, an optical low-pass filter, IR cut filter or sealed glass such as a solid image pickup element is assumed.

FIGS. 26a through 26d are diagrams of aberrations (spherical aberration, astigmatism, distortion and meridional coma, respectively) of the image pickup lens shown in Example 11.

The present Example employs a plastic material for all lenses, and is designed to move the first through third lenses are moved as one body as the operation that the lenses in the image pickup lens are partially moved to be drawn out for the auto-focusing operation and the switching operation to/from the macro photograph mode.

Table 12 shows values corresponding to the conditional expressions of the respective Examples (indicated by ex1 through ex11 in the Table).

TABLE 12

|  | ex 1 | ex 2 | ex 3 | ex 4 | ex 5 | ex 6 | ex 7 | ex 8 | ex 9 | ex 10 | ex 11 |
|---|---|---|---|---|---|---|---|---|---|---|---|
| (1) f1/f | 0.57 | 0.54 | 0.70 | 0.66 | 0.61 | 0.57 | 0.63 | 0.58 | 0.57 | 0.60 | 0.74 |
| (2) r1/f | 0.35 | 0.31 | 0.37 | 0.38 | 0.39 | 0.33 | 0.32 | 0.34 | 0.34 | 0.34 | 0.46 |
| (3) r4/r1 | 1.68 | 1.71 | 1.42 | 1.17 | 1.27 | 2.13 | 1.24 | 1.75 | 1.59 | 1.72 | 0.84 |
| (4) ν2 | 23.4 | 23.4 | 23.4 | 23.4 | 23.4 | 23.4 | 23.4 | 23.4 | 23.4 | 23.4 | 23.4 |
| (5) n2 | 1.632 | 1.632 | 1.632 | 1.632 | 1.632 | 1.632 | 1.632 | 1.632 | 1.632 | 1.632 | 1.632 |
| (6) ν3 | 23.4 | 23.4 | 23.4 | 23.4 | 30.0 | 23.4 | 23.4 | 23.4 | 23.4 | 23.4 | 56.0 |
| (7) d6/f | 0.085 | 0.065 | 0.132 | 0.063 | 0.094 | 0.113 | 0.154 | 0.103 | 0.102 | 0.061 | 0.144 |
| (8) f123/f | 0.97 | 0.92 | 1.27 | 1.16 | 0.97 | 0.99 | 1.16 | 0.95 | 0.95 | 1.11 | 0.89 |
| (9) L/2Y | 0.844 | 0.845 | 0.801 | 0.844 | 0.842 | 0.803 | 0.803 | 0.766 | 0.802 | 0.801 | 0.802 |

Plastic materials tend to have a refractive index which largely changes due to temperature change, and an image point of the total system of the image pickup lens is sometimes fluctuated due to a change of the environmental temperature when all of the first lens through the fifth lens are formed as plastic lenses, which is a problem.

In recent years, it has been known that a temperature change in a plastic material can be made small by blending inorganic microparticles in the plastic material. The detailed explanation is described below. When microparticles are blended in a transparent plastic material, transmittance of the transparent plastic materials is lowered due to scattering of light, as generally known. Therefore, such the plastic materials have been hardly used as optical materials. However, it is possible not to cause the scattering substantially by reducing the size of microparticles to be smaller than a wavelength of a transmitting light flux. A plastic material has a refractive index decreasing when its temperature rises, while, inorganic particles have a refractive index increasing when its temperature rises. It is therefore possible that a change in refractive index hardly occurs by employing a plastic material and inorganic particles whose temperature dependencies work to cancel each other. Specifically, by dispersing inorganic particles whose largest side is 20 nm or less into a plastic material representing a base material, it is possible to realize a plastic material having a refractive index whose temperature dependency is extremely low. For example, by dispersing microparticles of niobium oxide ($Nb_2O_5$) into acrylic resin, the material can provide reduced change in the refractive index caused by temperature changes. In the above examples, by employing plastic materials in which the aforesaid inorganic particles are dispersed, for positive lens (L1) whose refractive power is relatively large or for all lenses (L1-L5), the fluctuation of image point position caused by temperature changes in the total system of image pickup lens can be controlled to be small.

Further, in recent years, it has been known that temperature changes of plastic materials can be made small by blending inorganic microparticles in a plastic material. The detailed explanation is described below. When microparticles are blended in a transparent plastic material, the plastic materials has been hardly used as optical materials because transmittance of the transparent plastic materials is lowered due to scattering of light, as generally known. However, it is possible not to cause the scattering substantially by reducing the size of microparticles to be smaller than a wavelength of a transmitting light flux. A plastic material has a refractive index decreasing when its temperature rises, while, inorganic particles have a refractive index increasing when its temperature rises. It is therefore possible that a change in refractive index hardly occurs by employing a plastic material and inorganic particles whose temperature dependencies work to cancel each other. Specifically, by dispersing inorganic particles whose largest side is 20 nm or less into a plastic material representing a base material, it is possible to realize a plastic material having a refractive index whose temperature dependency is extremely low. For example, by dispersing microparticles of niobium oxide ($Nb_2O_5$) into acrylic resin, the material can provide reduced change in the refractive index caused by temperature changes. In the above examples, by employing plastic materials in which the aforesaid inorganic particles are dispersed, for positive lens (L1) whose refractive power is relatively large or for all lenses (L1-L5), the fluctuation of image point position caused by temperature changes in the total system of image pickup lens can be controlled to be small.

As a method for mass-producing image pickup apparatuses in the low cost, the following method has been proposed in recent years. There is provided a substrate on which solder is applied in advance. Electronic parts such as an IC chip and optical elements are mounted on the substrate and reflow processing (heat treatment) is added to the substrate with the electronic parts and optical elements, so that the solder is molten. Thus, the electronic parts and optical elements are mounted on the substrate simultaneously.

To use the reflow processing for mounting the electronic parts and optical elements, the electronic parts together with the optical element must be heated to about 200 through 260 degrees Celsius. At such a high temperature, the lens made of thermoplastic resin may be thermally deformed or discolored, and the optical performance thereof may be reduced. One way proposed to solve this problem is to use the glass molded lens characterized by excellent heat resistance, thereby ensuring compatibility between downsizing and satisfactory optical performances in a high-temperature environment. However, the lens produced by this method requires greater costs than the lens made of a thermoplastic resin. This proposal fails to meet the requirements for cutting down on the image pickup apparatus cost.

To solve such problems, energy-curable resin is used as the material for the image pickup lens. When the image pickup lens is exposed to high temperature, reduction in optical performance of the image pickup lens is smaller than that of the lens made of thermoplastic resin such as polycarbonate or polyolefin resin. Thus, use of the energy-curable resin is effective in reflow processing and ensures easier production and less costs than the use of a glass mold lens. This ensures compatibility between the low manufacturing cost and high-volume production capacity of the image pickup apparatus in which the image pickup lens is mounted. It should be noted in passing that the energy-curable resin refers to both the thermosetting resin and UV curable resin. The plastic lens of the present embodiments can be produced using the aforementioned energy-curable resin.

Incidentally, each of the above Examples is not necessarily designed such that an incident angle of a principal ray of the light flux that enters an image pickup surface of a solid-state image pickup element is sufficiently small at a peripheral portion of the image pickup surface. However, in the recent technology, it has become possible to reduce shading by a revision of an arrangement of a color filter of a solid-state image pickup element and an onchip-microlens-array. Specifically, if a pitch of the arrangement of the color filter and the onchip-microlens-array is designed to be slightly smaller compared with a pixel pitch of the image pickup surface of the imaging device, a light flux of oblique incidence can be guided efficiently, because the color filter and the onchip-microlens-array are shifted greater toward an optical axis of an image pickup lens at the position which is closer to a peripheral portion of the image pickup surface. Owing to this, shading generated on the solid-state imaging device can be controlled to be small. The present Examples provide design examples in which the above design requirement about the incident angle of the principal ray is lighten and the design requirement for downsizing is stronger.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. An image pickup lens having a five-lens-element construction for forming an image of an object on a photoelectrical converter of a solid-state image pickup element, the image pickup lens comprising, in order from an object side thereof:

a first lens having a positive power and comprising a convex surface facing the object side; an aperture stop;

a second lens having a negative power and comprising a concave surface facing an image side of the image pickup lens, at least one surface of the second lens being aspheric;

a third lens;

a fourth lens having a positive power and comprising a convex surface facing the image side; and a fifth lens having a negative power and comprising a concave surface facing the image side, wherein the first to fifth lenses are separated from each other, wherein the surface of the fourth lens facing the image side is an aspheric surface on which a center portion has a positive refractive power, and the positive refractive power becomes smaller at a position being farther from the center portion to a periphery, wherein the surface of the fifth lens facing the image side is an aspheric surface and an inflection point is arranged on an area on the surface of the fifth lens, the area excluding an intersection point of the surface of the fifth lens with an optical axis of the fifth lens, and the image pickup lens satisfies the following expression:

$$15<\nu 2<31,$$

wherein $\nu 2$ is an Abbe number of the second lens.

2. The image pickup lens of claim 1, satisfying the following expression:

$$0.25<r1/f<0.50,$$

where r1 is a curvature radius of the surface of the first lens facing the object side, and f is a focal length of a total system of the image pickup lens.

3. The image pickup lens of claim 1, satisfying the following expression:

$$0.70<r4/r1<2.50,$$

where r1 is a curvature radius of the surface of the first lens facing the object side, and r4 is a curvature radius of the surface of the second lens facing the image side.

4. The image pickup lens of claim 1, wherein the surface of the second lens facing the image side is an aspheric surface on which a center portion has a negative refractive power and the negative refractive power becomes smaller at a position being farther from the center portion to a periphery.

5. The image pickup lens of claim 1, wherein the fifth lens includes a concave surface facing the object side.

6. The image pickup lens of claim 1, satisfying the following expression:

$$1.6<n2<2.10,$$

where n2 is a refractive index of the second lens.

7. The image pickup lens of claim 1, wherein the third lens has a positive refractive power.

8. The image pickup lens of claim 1, wherein the third lens is in a meniscus shape whose convex surface faces the image side.

9. The image pickup lens of claim 1, satisfying the following expression:

$$15 < v3 < 31,$$

where v3 is an Abbe number of the third lens.

10. The image pickup lens of claim 1, wherein the fourth lens is in a meniscus shape whose convex surface faces the image side.

11. The image pickup lens of claim 1, wherein the image pickup lens moves the first, second, and third lenses for adjusting a focal position of the image pickup lens, and the image pickup lens satisfies the following expression:

$$0.05 < d6/f < 0.20,$$

where d6 is an air distance along an optical axis between the third lens and the fourth lens, and f is a focal length of a total system of the image pickup lens.

12. The image pickup lens of claim 11, satisfying the following expression:

$$0.7 < f123/f < 1.4,$$

where f123 is a composite focal length of the first, second, and third lenses.

13. The image pickup lens of claim 1, wherein each of the first to fifth lenses is formed of a plastic material.

14. An image pickup apparatus comprising: a solid-state image pickup element for photo-electrically converting an image of an object; and the image pickup lens of claim 1.

15. A mobile terminal comprising the image pickup apparatus of claim 14.

* * * * *